(12) United States Patent
Okumoto et al.

(10) Patent No.: US 8,793,061 B2
(45) Date of Patent: Jul. 29, 2014

(54) CONTROL DEVICE FOR CONTROLLING AUTOMATIC ENGINE STOP AND START

(75) Inventors: Kazushige Okumoto, Kariya (JP);
Hideya Notani, Kariya (JP); Tatsuya Fujita, Obu (JP); Yoshinori Yamaguchi, Kariya (JP)

(73) Assignee: Denso Corporation, Kariya (JP)

( * ) Notice: Subject to any disclaimer, the term of this patent is extended or adjusted under 35 U.S.C. 154(b) by 728 days.

(21) Appl. No.: 12/978,856

(22) Filed: Dec. 27, 2010

(65) Prior Publication Data

US 2011/0172901 A1 Jul. 14, 2011

(30) Foreign Application Priority Data

Jan. 11, 2010 (JP) ................................. 2010-003512
Nov. 29, 2010 (JP) ................................. 2010-265000

(51) Int. Cl.
*F02D 28/00* (2006.01)
(52) U.S. Cl.
USPC ....................................... 701/113; 123/179.4
(58) Field of Classification Search
CPC ... F02D 41/06; F02D 41/065; F02N 11/0855; F02N 11/0844; F02N 2200/022
USPC ..... 123/179.1, 179.3, 179.4; 290/38 R, 38 C; 701/104, 113
See application file for complete search history.

(56) References Cited

U.S. PATENT DOCUMENTS

| 7,066,128 B2 * | 6/2006 | Satake et al. ............... 123/179.4 |
| 8,069,832 B2 * | 12/2011 | Okumoto et al. .......... 123/179.4 |
| 8,131,452 B2 * | 3/2012 | Senda et al. .................. 701/110 |
| 8,196,558 B2 * | 6/2012 | Okumoto et al. .......... 123/179.4 |
| 8,290,693 B2 * | 10/2012 | Shoda et al. .................. 701/113 |
| 8,510,019 B2 * | 8/2013 | Okumoto et al. ............. 701/103 |
| 8,566,007 B2 * | 10/2013 | Shoda et al. .................. 701/104 |
| 2002/0017260 A1 | 2/2002 | Saito et al. |
| 2004/0221828 A1 | 11/2004 | Ries-Mueller et al. |

(Continued)

FOREIGN PATENT DOCUMENTS

| JP | A-2002-070699 | 3/2002 |
| JP | A-2002-122059 | 4/2002 |

(Continued)

OTHER PUBLICATIONS

Nov. 7, 2013 Office Action issued in Japanese Patent Application No. 2010-265000 (with translation).

(Continued)

*Primary Examiner* — Thomas Moulis
*Assistant Examiner* — Elizabeth Hadley
(74) *Attorney, Agent, or Firm* — Oliff PLC

(57) ABSTRACT

A control device performs fuel injection without cranking when engine-speed Ne is within a first-range (Ne>N1) and an engine-restart request occurs. The device performs the cranking after the synchronization in rotation-speed between pinion and ring gears, and the gear meshing operation between them when the engine-speed Ne is within a second range (N1≥Ne>N2) and the engine-restart request occurs. The device performs the cranking after the gear meshing operation and drives a starter to rotate the pinion gear when the engine-speed Ne is within a third-range (N3≥Ne) and the above request occurs. When the above request occurs in an engine restart ready-range (N2≥Ne>N3), the control device performs the cranking after the engine-speed Ne is decreased to a value within the third-range (N3≥Ne) and after the completion of the gear meshing operation.

20 Claims, 16 Drawing Sheets

(56) References Cited

U.S. PATENT DOCUMENTS

| | | |
|---|---|---|
| 2010/0050970 A1 | 3/2010 | Okumoto et al. |
| 2010/0059007 A1* | 3/2010 | Senda et al. ............... 123/179.4 |
| 2011/0137544 A1* | 6/2011 | Kawazu et al. ............... 701/113 |
| 2011/0172900 A1* | 7/2011 | Mukaihara et al. ........... 701/112 |
| 2012/0029797 A1* | 2/2012 | Notani .......................... 701/113 |

FOREIGN PATENT DOCUMENTS

| | | |
|---|---|---|
| JP | A-2004-245219 | 9/2004 |
| JP | A-2004-301080 | 10/2004 |
| JP | A-2005-330813 | 12/2005 |
| JP | A-2008-121648 | 5/2008 |
| JP | A-2009-036115 | 2/2009 |
| JP | A-2010-236533 | 10/2010 |

OTHER PUBLICATIONS

Feb. 13, 2014 Office Action issued in Japanese Patent Application No. 2010-265000 (with translation).

* cited by examiner

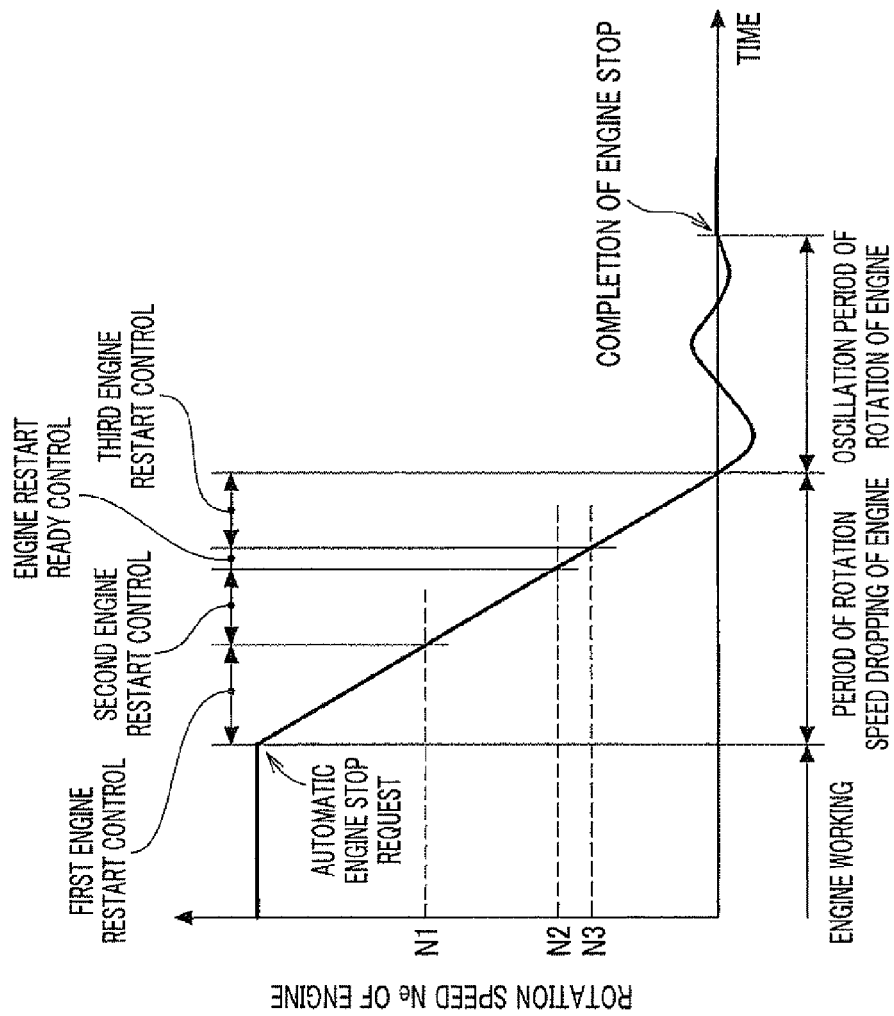

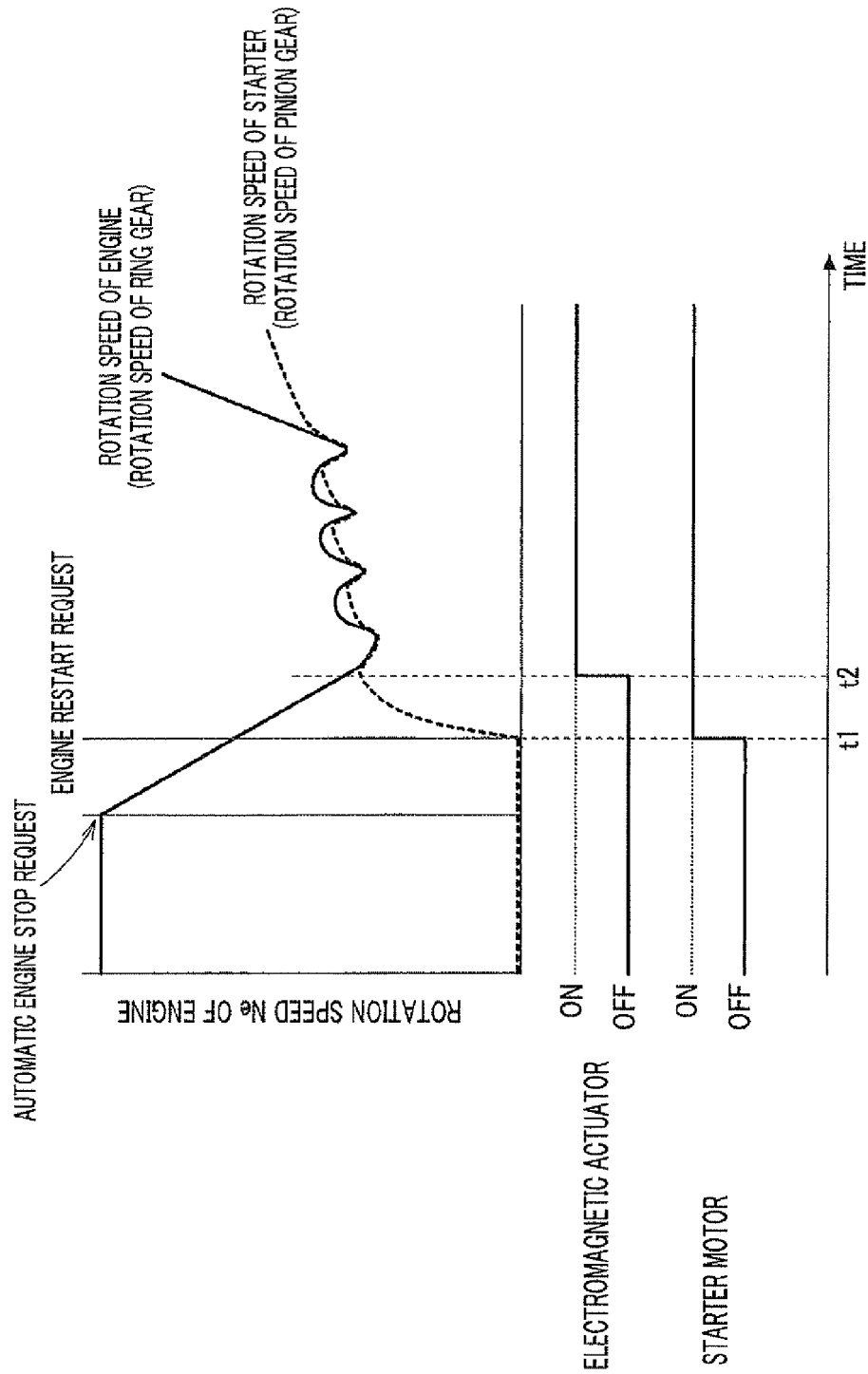

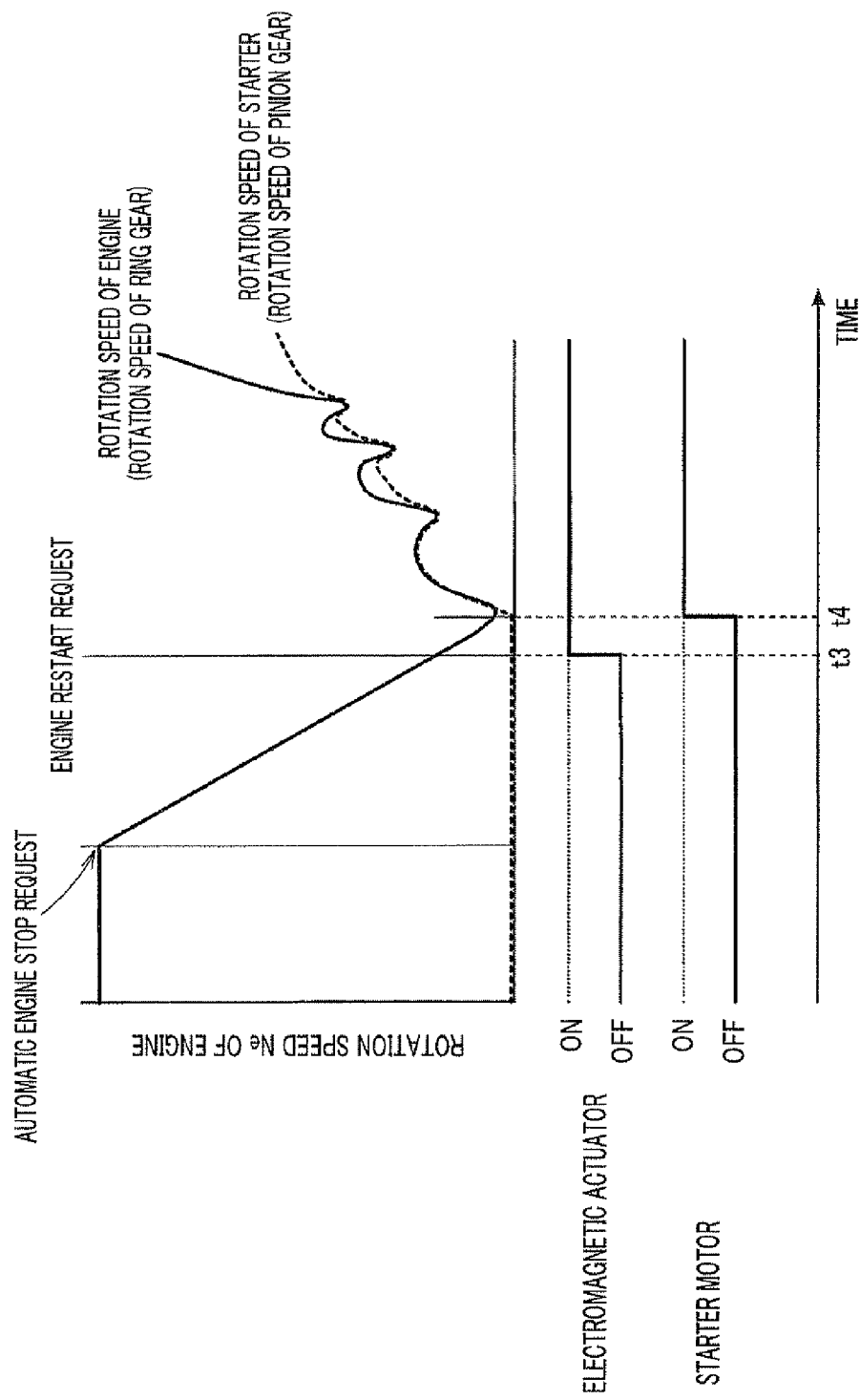

FIG.15

| °CA | rad/s | TORQUE LOSS CALCULATION | ROTATION SPEED ESTIMATION | | ARRIVAL TIME ESTIMATION |
|---|---|---|---|---|---|
| | | | REGISTER | | |
| 0 | ω[0,i-1] | | 0 → 30 | T[0-30,i-1] | |
| 30 | ω[30,i-1] | T[0-30,i-1]=-J(ω²[30,i-1]-ω²[0,i-1])/2 | 30 → 60 | T[30-60,i-1] | |
| 60 | ω[60,i-1] | T[30-60,i-1]=-J(ω²[60,i-1]-ω²[30,i-1])/2 | 60 → 90 | T[60-90,i-1] | |
| 90 | ω[90,i-1] | T[60-90,i-1]=-J(ω²[90,i-1]-ω²[60,i-1])/2 | 90 → 120 | T[90-120,i-1] | |
| 120 | ω[120,i-1] | T[90-120,i-1]=-J(ω²[120,i-1]-ω²[90,i-1])/2 | 120 → 150 | T[120-150,i-1] | |
| 150 | ω[150,i-1] | T[120-150,i-1]=-J(ω²[150,i-1]-ω²[120,i-1])/2 | 150 → 0 | T[150-0,i-1] | |
| 0 | ω[0,i] | T[150-0,i-1]=-J(ω²[0,i]-ω²[150,i-1])/2 | | | |
| 30 | ω[30,i] | T[0-30,i]=-J(ω²[30,i]-ω²[0,i])/2 | | | |
| 60 | ω[60,i] | | ω'²[60,i]=ω'²[30,i]-$\frac{2}{J}$T[30-60,i-1] | | $t_{[30-60,i]}=\frac{\pi}{60 \cdot \omega'_{[60,i]}}$ |
| 90 | ω[90,i] | | ω'²[90,i]=ω'²[60,i]-$\frac{2}{J}$T[60-90,i-1] =ω'²[30,i]-$\frac{2}{J}$(T[30-60,i-1]+T[60-90,i-1]) | | $t_{[60-90,i]}=\frac{\pi}{60 \cdot \omega'_{[90,i]}}$ |
| 120 | ω[120,i] | ESTIMATION OF NEXT ANGULAR VELOCITY AND ARRIVAL TIME | ω'²[120,i]=ω'²[90,i]-$\frac{2}{J}$T[90-120,i-1] =ω'²[30,i]-$\frac{2}{J}$(T[30-60,i-1]+T[60-90,i-1]+T[90-120,i-1]) | | ⋯ |
| 150 | ω[150,i] | | | | |
| 0 | ω[0,i+1] | | ω'²[30,i+1]=ω'²[30,i]-$\frac{2}{J}$(T[30-60,i-1]+T[60-90,i-1] +T[90-120,i-1] ⋯ +T[0-30,i-1]) | | $t_{[0-30,i+1]}=\frac{\pi}{60 \cdot \omega'_{[30,i+1]}}$ |
| 30 | ω[30,i+1] | | | | |
| 60 | ω[60,i+1] | | | | ⋯ | i-1 / CURRENT STATE (i) / i+1

CONTROL DEVICE FOR CONTROLLING AUTOMATIC ENGINE STOP AND START

CROSS-REFERENCE TO RELATED APPLICATION

This application is related to and claims priority from Japanese Patent Applications No. 2010-3512 filed on Jan. 11, 2010 and No. 2010-265000 filed on Nov. 29, 2010, the contents of which are hereby incorporated by reference.

BACKGROUND OF THE INVENTION

1. Field of the Invention

The present invention relates to control devices for controlling automatic engine stop and start. The control device is capable of automatically stopping the internal combustion engine of a vehicle on receiving an automatic engine stop request and automatically restarting the internal combustion engine on receiving an engine restart request.

2. Description of the Related Art

There is a recent trend for vehicles to be equipped with an automatic engine control system capable of automatically stopping and starting the internal combustion engine of a vehicle in order to improve fuel consumption and reduce exhaust gas emission. Such an automatic engine control system is called to as the "engine idle stop control system". The engine idle stop control system can automatically stop the engine when the driver intends to stop the vehicle, and automatically restart the engine when the driver of the vehicle operates various units in order to restart the engine, for example, the driver of the vehicle depresses the clutch pedal, releases the brake pedal, and operates a shift lever.

In general, the engine starter mounted to the internal combustion engine of a vehicle is comprised of an electric motor for pushing and rotating the pinion gear in order to engage with a ring gear fixed to the crank shaft of the internal combustion engine. This makes it possible for the pinion gear to be cranked with the ring gear fixed to the rotary shaft of the internal combustion engine of the vehicle. However, there is a possibility of generating large gear meshing noises and impacts due to the engagement when the pinion gear is meshed with the ring gear which is fixed to the crank shaft under a large difference of rotation speed between the pinion gear and the ring gear because the pinion gear cannot be smoothly meshed with the ring gear due to a large difference in rotation speed between them.

Conventional patent documents, for example, Japanese patent laid open publication No. JP 2002-122059 has disclosed a conventional technique which restarts the internal combustion engine of a vehicle by the following steps (a1) and (a2) when an engine restart request occurs when the rotation speed of the internal combustion engine is dropping immediately after the automatic engine stop of the internal combustion engine caused by the generation of an automatic engine stop request:

(a1) The pinion gear is meshed with the ring gear which is fixed to the crank shaft of the internal combustion engine when the rotation speed of the internal combustion engine (or the rotation speed of the ring gear) almost zero, namely, when the engine almost stops; and (a2) After the step (a1), the starter motor rotates the pinion gear in order to start the cranking.

However, if the engine restart request occurs when the rotation speed of the internal combustion engine is dropping due to the automatic engine stop, the above conventional technique disclosed in JP 2002-122059 increases a delay period of time counted from the time when an engine restart request occurs to the time when the internal combustion engine is actually restarted because the cranking must be performed by the starter motor in order to restart the internal combustion engine after the rotation speed of the internal combustion engine is almost zero, namely, the engine is almost stopped. This delay period of time may cause discomfort driving to the driver of the vehicle.

In order to solve the above conventional drawback, there are other conventional techniques disclosed in Japanese patent laid open publications No. JP 2005-330813 and JP 2002-70699, which restart the internal combustion engine of a vehicle by the following steps (b1) and (b2) when the engine restart request occurs when the period of the rotation speed of the internal combustion engine is dropping due to the occurrence of the automatic engine stop request and the stop of combustion of the internal combustion engine:

(b1) The pinion gear is meshed with the ring gear which is fixed to the crank shaft of the internal combustion engine after the rotation speed of the pinion gear is synchronized with the rotation speed of the ring gear so as to decrease a difference in rotation speed between the pinion gear and the ring gear; and (b2) After the step (b1), the starter motor starts to rotate the pinion gear in order to perform the cranking.

However, the conventional techniques disclosed in JP 2005-330813 and JP 2002-70699 only show the engagement between the pinion gear and the ring gear when they are synchronized with each other, but do not disclose and suggest any technique to detect and determine an optimum time in order to smoothly and correctly mesh the pinion gear with the ring gear. That is, the conventional techniques do not disclose and suggest any technique to detect and determine the optimum time when the pinion gear is meshed with the ring gear.

SUMMARY OF THE INVENTION

It is an object of the present invention to provide a control device for controlling automatic engine stop and start capable of smoothly restarting the internal combustion engine of a vehicle even if an engine restart request occurs when the rotation speed of the internal combustion engine is dropping due to the occurrence of the automatic engine stop request and the stop of fuel combustion in the internal combustion engine.

To achieve the above purposes, the present invention provides a control device as a first aspect of the present invention. The control device performs automatic engine stop and start. The control device of the first aspect of the present invention has a starter, a first engine restart control means, a second engine restart control means, an engine restart ready control means, and a third engine restart control means.

The starter is comprised of a starter motor. The starter motor rotates a pinion gear and an actuator capable of meshing the pinion gear with a ring gear which is fixed to the crank shaft of an internal combustion engine. The starter independently drives the starter motor and the actuator, respectively. The control device is capable of stopping the internal combustion engine when an automatic engine stop request occurs, and restarting the internal combustion engine when an engine restart request occurs. The first engine restart control means executes a first engine restart control which restarts a fuel injection in order to restart the internal combustion engine without performing a cranking by the starter when the engine restart request occurs when the rotation speed of the internal combustion engine is dropping due to the automatic engine stop and when a current rotation speed of the internal combustion engine is within a first rotation speed range which is higher than a first rotation speed. The second engine restart control means executes a second engine restart control which drives the starter motor in order to synchronize the rotation speed of the pinion gear with the rotation speed of the ring gear, and drives the actuator to mesh the pinion gear with the ring gear in order to perform the cranking and restart the internal combustion engine when the rotation speed of the internal combustion engine is decreased by the automatic engine stop, and the engine restart request occurs when the current rotation speed of the internal combustion engine is within a second rotation speed range which is not more than the first rotation speed and higher than a second rotation speed. The engine restart ready control means executes an engine restart ready control of not driving the starter to perform the cranking when the engine restart request occurs while the rotation speed of the internal combustion engine is dropping due to the automatic engine stop and when the current rotation speed of the internal combustion engine is within a rotation speed ready range. The rotation speed ready range is not more than the second rotation speed and higher than a third rotation speed. After this control operation, the engine restart ready control means drives the actuator to mesh the pinion gear with the ring gear when the current rotation speed of the internal combustion engine is within a third rotation speed range which is not more than the third rotation speed, and after or during the above meshing operation, the engine restart ready control means drives the starter to perform the cranking by the starter motor. Further, the third engine restart control means executes a third engine restart control of driving the actuator to mesh the pinion gear with the ring gear when the engine restart request occurs while the rotation speed of the internal combustion engine is dropping due to the automatic engine stop and when the current rotation speed of the internal combustion engine is within the third rotation speed range which is not more than the third rotation speed, and after or during the above gear meshing operation, the engine restart ready control means drives the starter to perform the cranking by the starter motor in order to restart the internal combustion engine.

When the engine restart request occurs while the rotation speed of the internal combustion engine is dropping due to the automatic engine stop and when the rotation speed of the internal combustion engine is within the first rotation speed range which is a high rotation speed range, the first engine restart control means in the control device having the above configuration determines that it is not necessary for the starter to perform any cranking. In this case, the control device restarts the fuel injection without performing any cranking in order to restart the internal combustion engine. This makes it possible for the control device to immediately restart the combustion in order to restart the internal combustion engine immediately when the engine restart request occurs. Further, because the control device does not drive the starter to perform the cranking, it is possible for the starter to have zero power consumption, and because the control device does not drives the starter motor to mesh the pinion gear with the ring gear under a large difference in rotation speed between the pinion gear and the ring gear, it is possible to avoid gear meshing noises from being generated.

Further, when the engine restart request occurs while the rotation speed of the internal combustion engine is dropping due to the automatic engine stop and when the rotation speed of the internal combustion engine is within the second rotation speed range, the second engine restart control means in the control device having the above configuration determines that it is impossible to smoothly mesh the pinion gear with the ring gear unless the rotation speed of the pinion gear is synchronized with the rotation speed of the ring gear because the rotation speed of the ring gear is higher than the rotation speed of the pinion gear. The second engine restart control means thereby executes the second engine restart control which drives the starter motor in order to synchronize the rotation speed of the pinion gear with the rotation speed of the ring gear and to decrease the difference in rotation speed between them. After this control, the second engine start control means drives the actuator to mesh the pinion gear with the ring gear in order to perform the cranking. Accordingly, it is possible to smoothly mesh the pinion gear with the ring gear and thereby restart the internal combustion engine while preventing gear meshing noises from being generated and decreasing a delayed period counted from the time of the generation of the engine restart request to the time when the internal combustion engine is restarted.

Still further, when the engine restart request occurs while the rotation speed of the internal combustion engine is dropping due to the automatic engine stop and when the rotation speed of the internal combustion engine is within the third rotation speed range which is a low rotation speed range, the third engine restart control means in the control device having the above configuration determines that it is possible to smoothly mesh the pinion gear with the ring gear without performing the synchronization in rotation speed between the pinion gear and the ring gear because the current rotation speed of the ring gear is lower than the rotation speed of the pinion gear. The third engine restart control means drives the actuator to mesh the pinion gear with the ring gear when the engine restart request occurs, and after or during this gear meshing operation, the third engine restart control means drives the starter to perform the cranking in order to restart the internal combustion engine.

This makes it possible to eliminate the synchronizing operation in rotation speed between the pinion gear and the ring gear while preventing gear meshing noises from being generated, and thereby possible for the starter to immediately start the cranking, and obtain the rapid engine restart and decrease the power consumption of the starter.

If the second rotation speed range and the third rotation speed range are continued without having the rotation speed ready range between the second and third rotation speed ranges, the following problem would be caused because the rotation speed of the internal combustion engine is oscillated and gradually decreased while the rotation speed of the internal combustion engine is dropping due to the automatic engine stop.

FIG. 9 is a timing chart showing the above problem caused by the engine restart control. As shown in FIG. 9, because the rotation speed of the internal combustion engine is oscillated and gradually decreased while the rotation speed of the internal combustion engine is dropping due to the automatic engine stop, when the second rotation speed range and the third rotation speed range are adjacent with each other, the rotation speed is gradually decreased while the rotation speed oscillates around the boundary of the second rotation speed range and the third rotation speed range. Therefore when the engine restart request occurs even if the current rotation speed is within the second rotation range when the current rotation speed of the internal combustion engine is around the boundary between the second rotation speed range and the third rotation speed range, there is a possibility for the current rotation speed to immediately enter the third rotation speed range. On the other hand, when the engine restart request occurs even if the current rotation speed is in the third rotation range when the current rotation speed of the internal combustion engine is around the boundary between the second rotation speed range and the third rotation speed range, there is a possibility for the current rotation speed to immediately enter the second rotation speed range. This phenomenon requires a complicated control for estimating the rotation speed of the internal combustion engine with high accuracy, and the control device cannot execute the smooth engine restart control.

In order to solve the above problem, the control device according to the present invention has the engine restart ready control means which uses the rotation speed ready range between the second rotation speed range and the third rotation speed range.

When the engine restart request occurs in the rotation speed ready range, the engine restart ready control means does not drive the starter to perform the cranking. After this, when the rotation speed of the internal combustion engine is within the rotation speed ready range, the engine restart ready control means drives the starter motor to rotate the pinion gear in order to perform the cranking after driving the actuator to mesh the pinion gear with the ring gear or during the gear meshing operation. This makes it possible for the control device to smoothly restart the internal combustion engine without performing any complicated engine restart control for estimating the current rotation speed with high accuracy even if the engine restart request occurs during the rotation speed ready range at the boundary of the second rotation speed range and the third rotation speed range. In this control process by the engine restart ready control means, even if the engine restart request occurs when the rotation speed of the internal combustion engine is within the rotation speed ready range, the starter restarts the cranking and the internal combustion engine is thereby restarted after the rotation speed of the internal combustion engine is within the third rotation speed range. Because the period of time in which the rotation speed of the internal combustion engine passes through the rotation speed ready range is short, it is possible to set the delay period of time to an allowable delay period of time, where the delay period of time is a time period counted from the time when the engine restart request occurs to the time when the internal combustion engine is restarted.

In accordance with a second aspect of the present invention, there is provided a control device which is comprised of the same components and means in the control device, previously described as the first aspect of the present invention, other than the first engine restart control means which executes the first engine restart control in which the fuel injection is restarted in order to restart the internal combustion engine without performing the cranking by the starter.

In accordance with a third aspect of the present invention, there is provided a control device for controlling automatic engine stop and start having a starter, a first engine restart control means, and an engine restart ready control means. The starter is comprised of a starter motor for rotating a pinion gear and an actuator capable of meshing the pinion gear with a ring gear. The ring gear is fixed to a crank shaft of an internal combustion engine. The starter independently drives the starter motor and the actuator, respectively. The control device is capable of stopping the internal combustion engine when an automatic engine stop request occurs, and restarting the internal combustion engine when an engine restart request occurs. The first engine restart control means executes a first engine restart control of restarting a fuel injection in order to restart the internal combustion engine without performing a cranking by the starter when the engine restart request occurs while the rotation speed of the internal combustion engine is dropping due to the automatic engine stop and when a current rotation speed of the internal combustion engine is within a first rotation speed range which is higher than a first rotation speed. The engine restart ready control means executes an engine restart ready control for not driving the starter to perform the cranking when the engine restart request occurs while the rotation speed of the internal combustion engine is dropping due to the automatic engine stop and when the current rotation speed of the internal combustion engine is within a rotation speed ready range. The rotation speed ready range is not more than the first rotation speed and higher than a second rotation speed. After this control operation, the engine restart ready control means drives the starter motor to synchronize the rotation speed of the pinion gear with the rotation speed of the ring gear when the current rotation speed of the internal combustion engine is within a second rotation speed range which is not more than the second rotation speed and higher than the third rotation speed. After this rotation speed synchronizing operation, the engine restart ready control means drives the actuator to mesh the pinion gear with the ring gear, and then drives the starter to perform the cranking by the starter motor in order to restart the internal combustion engine.

According to the present invention, even if the engine restart request occurs in the rotation speed ready range between the first rotation speed range and the second rotation speed range, it is possible for the control device to smoothly restart the internal combustion engine without performing any complicated engine restart control for estimating the current rotation speed with high accuracy even if the engine restart request occurs during the rotation speed ready range at the boundary of the first rotation speed range and the second rotation speed range. In this control process by the engine restart ready control means, even if the engine restart request occurs when the rotation speed of the internal combustion engine is within the rotation speed ready range, the starter restarts the cranking and the internal combustion engine is thereby restarted after the rotation speed of the internal combustion engine is within the second rotation speed range. Because the period of time for the rotation speed of the internal combustion engine to pass through the rotation speed ready range, it is possible to set the delay period of time to an allowable delay period of time, where the delay period of time is a period counted from the time when the engine restart request occurs to the time when the internal combustion engine is restarted.

In accordance with a fourth aspect of the present invention, there is provided a control device for controlling automatic engine stop and start having a starter, a first engine restart control means, and an engine restart ready control means. The starter is comprised of a starter motor for rotating a pinion gear and an actuator capable of meshing the pinion gear with a ring gear which is fixed to a crank shaft of an internal combustion engine, and the starter independently driving the starter motor and the actuator, respectively, and the control device capable of stopping the internal combustion engine when an automatic engine stop request occurs, and restarting the internal combustion engine when an engine restart request occurs. The first engine restart control means executes a first engine restart control of restarting a fuel injection in order to restart the internal combustion engine without performing a cranking by the starter when the engine restart request occurs while the rotation speed of the internal combustion engine is dropping due to the automatic engine stop and when a current rotation speed of the internal combustion engine is within a first rotation speed range which is higher than a first rotation speed. The engine restart ready control means executes an engine restart ready control for not driving the starter to perform the cranking when the engine restart request occurs while the rotation speed of the internal combustion engine is dropping due to the automatic engine stop and when the current rotation speed of the internal combustion engine is within a rotation speed ready range which is not more than the first rotation speed and higher than a third rotation speed. After this control operation, the engine restart ready control means drives the actuator to mesh the pinion gear with the ring gear when the current rotation speed of the internal combustion engine is within a third rotation speed range which is not more than the third rotation speed, and after or during this gear meshing operation, the engine restart ready control means drives the starter to perform the cranking by the starter motor in order to restart the internal combustion engine.

According to the present invention, even if the engine restart request occurs in the rotation speed ready range which is set between the first rotation speed range and the third rotation speed range, it is possible for the control device to smoothly restart the internal combustion engine without performing any complicated engine restart control for estimating the current rotation speed with high accuracy even if the engine restart request occurs during the rotation speed ready range at the boundary of the first rotation speed range and the second rotation speed range. In this control process by the engine restart ready control means, even if the engine restart request occurs when the rotation speed of the internal combustion engine is within the rotation speed ready range, the starter restarts the cranking and the internal combustion engine is thereby restarted after the rotation speed of the internal combustion engine is within the second rotation speed range. Because the time period necessary for the rotation speed of the internal combustion engine to pass through the rotation speed ready range is short, it is possible to set the delay period of time to an allowable delay period of time, where the delay period of time is counted from the time when the engine restart request occurs to the time when the internal combustion engine is restarted.

BRIEF DESCRIPTION OF THE DRAWINGS

A preferred, non-limiting embodiment of the present invention will be described by way of example with reference to the accompanying drawings, in which:

FIG. 2 is a timing chart showing an engine restart control performed by the control device according to the first embodiment shown in FIG. 1;

FIG. 3 is a timing chart showing a second engine restart control by the control device according to the first embodiment shown in FIG. 1;

FIG. 5 is a timing chart showing a third engine restart control by the control device according to the first embodiment shown in FIG. 1;

FIG. 15 is a view showing a method of estimating the track curve when the rotation speed of the internal combustion engine is decreased after the automatic engine stop.

DETAILED DESCRIPTION OF THE PREFERRED EMBODIMENTS

Figure 1:
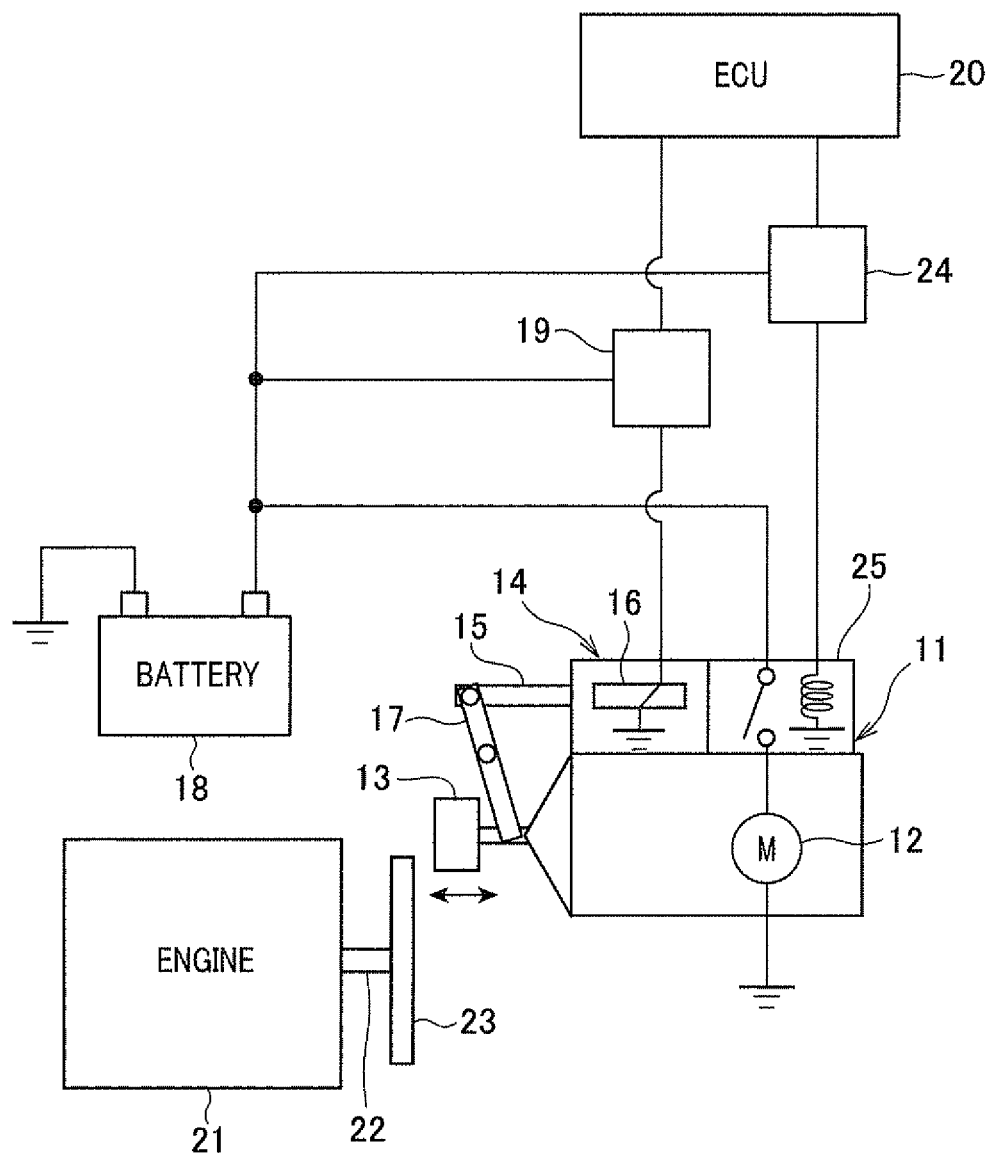
FIG. 1 is a view showing a schematic configuration of a control device for executing an automatic engine stop and start routine according to a first embodiment of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of the engine control device according to a first embodiment of the present invention with reference to FIG. 1 to FIG. 6.

FIG. 1 is a view showing a schematic configuration of the control device 10 capable of executing an automatic engine stop and start routine according to the first embodiment of the present invention.

A description will now be given of a schematic configuration of the engine start control system with reference to FIG. 1.

A starter 11 has a mechanism for pushing the pinion gear to the ring gear when the internal combustion engine 21 is started. The ring gear is fixed to the crank shaft of the internal combustion engine 21. The starter 11 is comprised of a starter motor 12, the pinion gear 13, and an electromagnetic actuator 14. The pinion gear 13 is driven by the starter motor 12. The electromagnetic actuator 14 pushes the pinion gear 13 so as to mesh the pinion gear 13 with the ring gear 23 when the starter 11 starts the internal combustion engine 21.

The pinion gear 13 is arranged to move in the axial direction of the starter 11 in parallel to the axial direction of the crank shaft 22 of the internal combustion engine 21. The electromagnetic actuator 14 is equipped with a plunger 15 and a solenoid 16. The driving force of the plunger 15 is transmitted to the pinion gear 13 through the lever 17, etc. when the starter 11 starts the internal combustion engine 21.

A relay 19 is placed between the battery 18 and the electromagnetic actuator 14. When an engine control circuit (ECU) 20 drives the relay 19 to be electrically turned on, the plunger 15 is moved in the direction so as to push the pinion gear 13 to the ring gear 23. The pinion gear is thereby meshed with the ring gear 23 which is fixed to the crank shaft 22 of the internal combustion engine 21.

A mechanical relay 25 and a switching element 24 are placed between the battery 18 and the starter motor 12. When the ECU 20 drives the switching element 24 to be electrically turned on, the mechanical relay 25 is thereby turned on, and the electric power of the battery 18 is supplied to the starter motor 12. The pinion gear 13 is thereby rotated by the starter motor 12.

The ECU 20 is comprised of a microcomputer. The microcomputer has a built-in read only memory (ROM) in which various types of engine control programs are stored. The ECU 20 executes these engine control programs in order to adjust a quantity of fuel injection and an ignition period of time when the fuel is injected into cylinders of the internal combustion engine 21.

The ECU 20 executes an automatic engine stop and start control routine (not shown) in order to execute the automatic engine stop and start control (that is, the engine idle stop control).

This automatic engine stop and start control automatically stops the combustion of the internal combustion engine 21 in order to automatically stop the operation of the internal combustion engine 21 when the driver stops the vehicle or a speed reduction request occurs during the vehicle running on a road by the following driver's operations, for example:

(c1) The driver of a vehicle releases the acceleration pedal; or (c2) The driver depresses the brake pedal.

After this, the ECU 20 judges the generation of the engine restart request when the speed reduction request is released during the running of the vehicle or the driver of the vehicle performs the following operations (d1), (d2):

(d1) The driver of the vehicle releases the brake pedal;

(d2) The driver of the vehicle operates the shift lever; or (d3) The driver of the vehicle depresses the acceleration pedal.

When detecting the above operations (c1), (c2), (d1), (d2), or (d3), the ECU 20 in the control device executes the engine restart control routine by the following procedures.

FIG. 2 is a timing chart showing the engine restart control performed by the control device according to the first embodiment shown in FIG. 1.

As shown in FIG. 2, when the automatic engine stop request occurs, the combustion is stopped in order to automatically stop the operation of the internal combustion engine 21.

(1) During the drop period of the rotation speed Ne of the internal combustion engine 21 by the automatic engine stop control, when the engine restart request occurs in a first rotation speed range (Ne>N1) in which the rotation speed Ne of the internal combustion engine 21 is higher than the first rotation speed N1 (e.g. 500 rpm), the ECU 20 judges that it is possible to restart the internal combustion engine 21 without performing the cranking operation by the starter 11, and the ECU 20 executes the first engine restart control. That is, in the first engine restart control, the control device drives the injectors to inject combustion fuel into the cylinders of the internal combustion engine 21 and ignite the combustion fuel in order to restart the internal combustion engine 21.

This control makes it possible to smoothly restart the combustion of the internal combustion engine 21 immediately when the engine restart request occurs. Because this control does not require any cranking of the pinion gear 13 and the ring gear 23 by the starter 11, it is possible for the starter 11 to have zero power consumption, and to avoid the engagement between the pinion gear 13 and the ring gear 23 when there is a large difference in rotation speed between the pinion gear 13 and the ring gear 23. This control thereby prevents gear meshing noises from being generated.

(2) While the rotation speed of the internal combustion engine is dropping due to the automatic engine stop, when the engine restart request occurs in a second rotation speed range (N1≥Ne>N2) in which the rotation speed Ne of the internal combustion engine 21 is lower than the first rotation speed N1 and higher than the second rotation speed N2 (e.g., 350 rpm), the ECU 20 executes a second engine restart control because judging the difficulty to smoothly mesh the pinion gear 13 with the ring gear 23 unless the rotation speed of the pinion gear 13 is synchronized with the rotation speed of the ring gear 23. In the second engine restart control, the ECU 20 in the control device executes the following control:

(e1) The rotation speed of the pinion gear 13 is increased by the starter motor 12 in order to synchronize the rotation speed of the pinion gear 13 with the rotation speed of the ring gear 23; and (e2) After the step (e1), the ECU 20 drives the electromagnetic actuator 14 to start the cranking in order to mesh the pinion gear 13 with the ring gear 23. After this gear meshing control, the internal combustion engine 21 is restarted.

FIG. 3 is a timing chart showing the second engine restart control executed by the control device according to the first embodiment shown in FIG. 1.

In particular, as shown in FIG. 3, the ECU 20 drives the starter motor 12 to be electrically turned on in order to rotate the pinion gear 13 at the time t1 when the engine restart request occurs in the second rotation speed range of the rotation speed Ne of the internal combustion engine 21. The ECU 20 judges that the rotation speed of the pinion gear 13 is synchronized with the rotation speed of the ring gear 23 at the time t2 when the difference in rotation speed between the ring gear 23 and the pinion gear 13 is within a range of ±200 rpm. The ECU 20 drives the electromagnetic actuator 14 to be electrically turned on and drives the starter 11 to start the cranking in which the pinion gear 13 is completely meshed with the ring gear 23 in order to restart the internal combustion engine 21. The difference in rotation speed between the ring gear 23 and the pinion gear 13 is equal in meaning to the difference of the rotation speed which is a reduced value of the crank shaft 22.

The above control makes it possible to decrease the delay counted from the time when the engine restart request occurs to the time when the internal combustion engine 21 is restarted while smoothly meshing the pinion gear 13 with the ring gear 23 and suppressing gear meshing noises from being generated.

Further, the above engine start control does not need to detect the rotation speed of the pinion gear 13 and the ring gear 23 with high accuracy when the ECU 20 judges the synchronization in rotation speed between the pinion gear 13 and the ring gear 23. It is thereby possible for the control device to be equipped with a usual rotation speed sensor without an expensive crank angle sensor and rotation speed sensor with high accuracy. This feature can reduce the manufacturing cost which is a recent important technical issue.

In the first embodiment described above in detail, the ring gear is 300 mm in diameter (outer diameter of tooth tip) and the pinion gear 13 is 30 mm in diameter (outer diameter of tooth tip). For example, when the ring gear rotates at the rotation speed of 300 rpm, and the pinion gear rotates at the rotation speed of 1000 rpm, the difference in rotation speed between the ring gear 23 and the pinion gear 13 is 200 rpm, where the difference in rotation speed is the different value which is a reduced value of the rotation speed of the crank shaft 22. Because the ring gear 23 is 300 mm in diameter and rotates at 300 rpm, the circumferential speed at the pitch circle (as a virtual circle which is contacted with the tooth of the pinion gear 13) of the ring gear 23 is approximately 4.7 m/sec.

Further, because the pinion gear 13 is 30 mm in diameter, and rotates at 1000 rpm, the circumferential speed at the pitch circle (as a virtual circle which is contacted with the tooth of the ring gear 23) of the pinion gear 13 is approximately 1.6 m/sec. The difference in circumferential speed between the pitch circle of the ring gear 23 and the pitch circle of the pinion gear 13 is approximately 3.1 m/sec. The following condition (f1) is therefore equal to the following condition (f2):

(f1) The difference in rotation speed between the ring gear 23 and the pinion gear 13 is within a range of ±200 rpm; and (f2) The difference in circumferential speed between the pitch circle of the ring gear 13 and the pitch circle of the pinion gear 13 is within a range of ±3.1 m/sec.

Figure 4A:
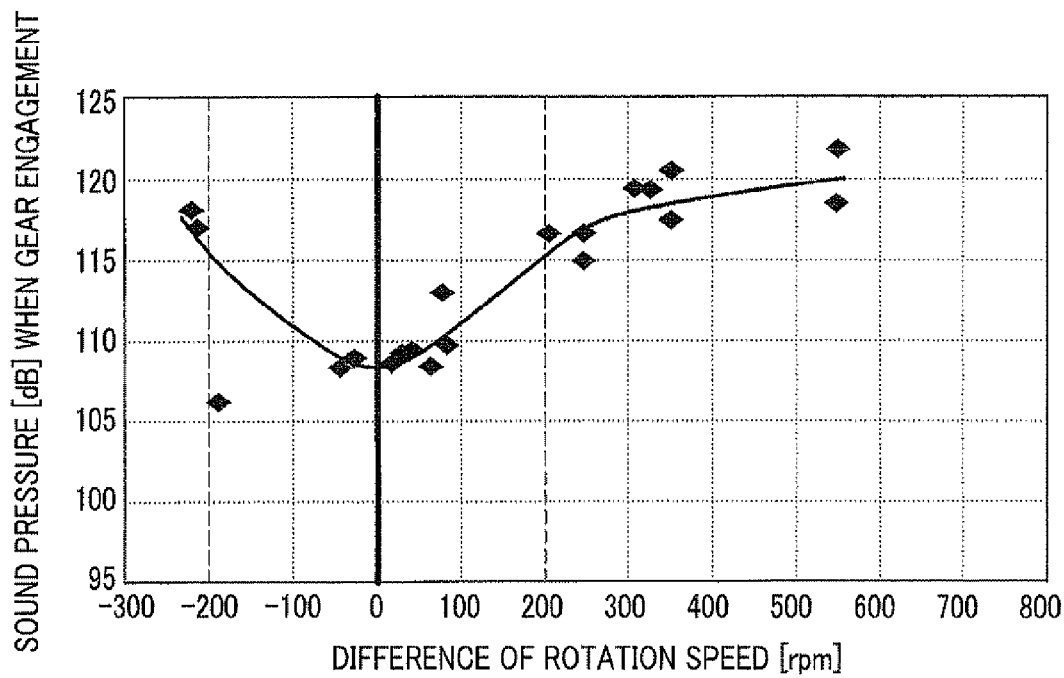
FIG. 4A and FIG. 4B are views showing a relationship between a level of sound pressure when a pinion gear is meshed with a ring gear and a difference in rotation speed between the pinion gear and the ring gear.
Figure 4B:
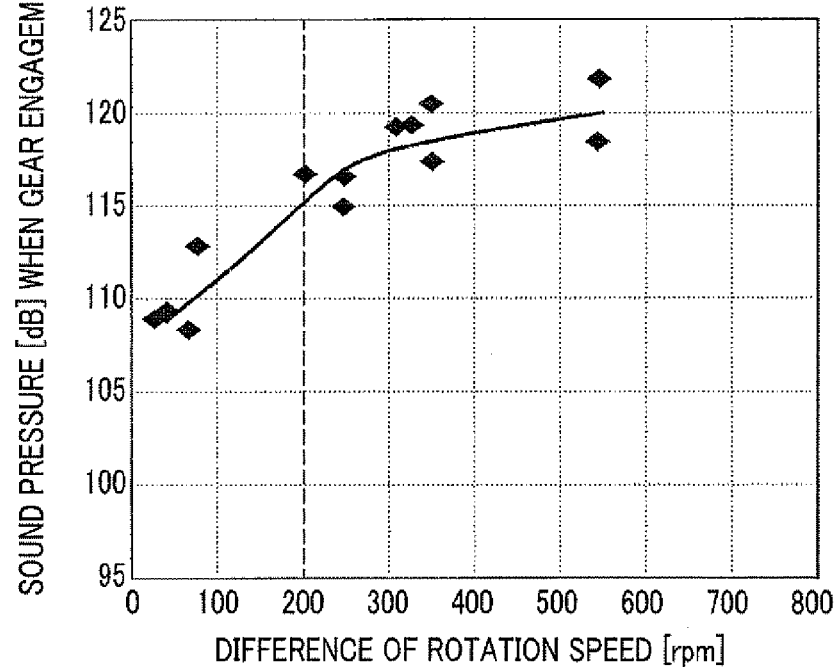

The inventors of the present invention did the experiment of detecting gear meshing noises when the pinion gear 13 is meshed with the ring gear 23. FIG. 4A and FIG. 4B are views showing the experimental results which show a relationship between a level in sound pressure when the pinion gear 13 is meshed with the ring gear 23 and a difference in rotation speed between the ring gear 23 and the pinion gear 13.

The experiment detected gear meshing noises generated between the ring gear 13 of 300 mm diameter and the pinion gear 13 of 30 mm diameter by changing the difference in rotation speed between the ring gear 23 and the pinion gear 13 which are meshed together. The gear meshing noises were detected by a microphone which was separated in distance from the pinion gear 13 and the ring gear 23.

The experimental results shown in FIG. 4A and FIG. 4B clearly show that it is possible to adequately reduce the mesh noise when the pinion gear 13 is meshed with the ring gear 23 under the following conditions:

(g1) The difference in rotation speed between the ring gear 23 and the pinion gear 13 is within a range of ±250 rpm; and (g2) More preferably, the difference in rotation speed between the ring gear 23 and the pinion gear 13 is within a range of ±200 rpm (that is, the difference in circumferential speed between the pitch circle of the pinion gear 13 and the pitch circle of the ring gear 23 is within a range of ±3.1 m/sec).

The rotation power of the starter motor 12 is transmitted to the pinion gear 13 in the direction of rotation of the internal combustion engine 21. In a system in which a one-way clutch is placed between the pinion gear 13 and the starter motor 12, it is acceptable to judge that the rotation speed of the pinion gear 13 is synchronized with the rotation speed of the ring gear 23 when the rotation speed of the ring gear 23 is higher than the rotation speed of the pinion gear 13 and a difference in rotation speed between the ring gear 23 and the pinion gear 13 is not more than a predetermined value (e.g., 200 rpm).

The following condition (f1) is therefore equal to the following condition (f2):

(f1) The difference in rotation speed between the ring gear 23 and the pinion gear 13 is within a range of ±200 rpm; and (f2) The difference in circumferential speed between the pitch circle of the ring gear 13 and the pitch circle of the pinion gear 13 is within a range of ±3.1 m/sec.

In the case when the ECU 20 judges that the rotation speed of the pinion gear 13 is synchronized with the rotation speed of the ring gear 23, the pinion gear 13 is meshed with the ring gear 23 when the rotation speed of the ring gear 23 is higher than that of the pinion gear 13. It is thereby possible for the one-way clutch to race in order to release a shock to be applied to the starter 11 when the pinion gear 13 is meshed with the ring gear 23. After this step, the rotation speed of the internal combustion engine 21 (or the rotation speed of the ring gear 23) is decreased by friction, and the rotation speed of the starter motor 12 (or the rotation speed of the pinion gear 13) is increased. When the difference in rotation speed between the ring gear 23 and the pinion gear 13 is thereby zero, the one-way clutch is locked, and the rotation power of the starter motor 12 is transmitted to the pinion gear 13. These steps can smoothly mesh the pinion gear 13 with the ring gear 23 without generating gear meshing noises and suppressing shock to the components of the starter motor 11 from being decreased. This can improve and maintain the durability of the components such as the ring gear 23 and the pinion gear 13 of the starter 11.

(3) While the rotation speed of the internal combustion engine is dropping due to the automatic engine stop control, when the engine restart request occurs in a third rotation speed range (N3≥Ne) in which the rotation speed Ne of the internal combustion engine 21 is lower than a third rotation speed N3 (e.g. 250 rpm) which is lower than the second rotation speed N2, the ECU 20 executes a third engine restart control because the rotation speed of the ring gear 23 is low, and the ECU 20 judges that it is possible to smoothly mesh the pinion gear 13 with the ring gear 23 without performing any synchronization between the pinion gear 13 and the ring gear 23.

In the third engine restart control, the ECU 20 in the control device executes the following control. After the ECU 20 drives the electromagnetic actuator 14 to mesh the pinion gear 13 with the ring gear 23 or during the gear meshing operation of the pinion gear 13 and the ring gear 23 by the electromagnetic actuator 14, the ECU 20 drives the starter motor 12 to rotate the pinion gear 13 in order to restart the internal combustion engine 21 by performing the cranking.

FIG. 5 is a timing chart showing the third engine restart control by the control device according to the first embodiment shown in FIG. 1.

Specifically, as shown in FIG. 5, the ECU 20 drives the electromagnetic actuator 14 to be electrically turned on at the time t3 in order to mesh the pinion gear 13 with the ring gear 23. After completion of the gear meshing between them at the time t4 or during the gear meshing operation of the pinion gear 13 and the ring gear 23 by the electromagnetic actuator 14, the electric power is supplied to the starter 11 in order to start the cranking and the internal combustion engine 21 is thereby restarted.

The third engine restart control described above makes it possible to avoid the synchronization in rotation speed between the pinion gear 13 and the ring gear 23 while the pinion gear 13 is smoothly meshed with the ring gear 23 and preventing or suppressing gear meshing noises from being generated. This makes it possible to rapidly perform the cranking by the starter 11 and rapidly restart the internal combustion engine 21, and decrease the power consumption of the starter 11.

(4) While the rotation speed of the internal combustion engine is dropping due to the automatic engine stop control, when the engine restart request occurs in a rotation speed ready range (N2≥Ne>N3) in which the rotation speed Ne of the internal combustion engine 21 is lower than the second rotation speed N2 and higher than the third rotation speed N3, the ECU 20 executes an engine restart ready control. In the engine restart ready control, when the rotation speed Ne of the internal combustion engine 21 is within the third rotation speed range which is not more than the third rotation speed N3, the ECU 20 drives the starter 11 to perform the cranking and restart the internal combustion engine 21 after the ECU 20 drives the electromagnetic actuator 14, as in the case for the third engine restart control previously described, to mesh the pinion gear 13 with the ring gear 23 or during the gear meshing operation of the pinion gear 13 and the ring gear 23 by the electromagnetic actuator 14.

It is possible to smoothly restart the internal combustion engine 21 without performing any complicated engine restart control on the basis of a high accuracy estimation of the rotation speed Ne of the internal combustion engine 21 even if the engine restart request occurs during the rotation speed ready range which is set between the second rotation speed range and the third rotation speed range. In this case, the internal combustion engine 21 is restarted by the cranking performed by the starter 11 after the rotation speed of the internal combustion engine 21 is within the third rotation speed range after the engine restart request occurs when the rotation speed Ne of the internal combustion engine 21 is in the rotation speed ready range. However, because the time period in which the rotation speed Ne of the internal combustion engine 21 passes through the rotation speed ready range is short, it is possible to set a delay period until the internal combustion engine 21 is restarted to the allowable delay range.

When the internal combustion engine 21 is restarted, the ECU 20 estimates the rotation speed Ne of the internal combustion engine 21 by referring to a map showing the relationship between a rotation speed Ne of the internal combustion engine 21 and an elapsed time period counted from the time when the engine restart request occurs. This estimated rotation speed Ne of the internal combustion engine 21 corresponds to the elapsed period of time which is counted from the time when the automatic engine stop request (or the combustion stop request of the internal combustion engine 21) occurs. This map is made in advance on the basis of the experimental data items and statistical data items, and stored in a memory device such as a read only memory (ROM).

In general, because the rotation speed Ne of the internal combustion engine 21 is gradually decreased according to the elapsed time period counted from the time when the combustion of the internal combustion engine 21 is stopped, it is possible to easily estimate the rotation speed Ne of the internal combustion engine 21 on the basis of the elapsed time period counted from the time when the automatic engine stop request occurs.

Still further, the rotation speed of the pinion gear 13 is estimated or calculated corresponding to the relationship between the period of time to supply the electric power to the starter motor 12 and the magnitude of a current flowing through the starter motor 12 by referring the rotation speed map of the pinion gear 13 which shows the relationship between parameters such as the power supplying period of time to the starter motor 13 and the magnitude of current to be supplied (such as a duty ratio). This rotation speed map is made in advance on the basis of experimental data items and design data items. The rotation speed map is stored in the ROM in the ECU 20.

In general, the rotation speed of the starter motor 12 is increased according to the elapsed period of time counted from the time when the electric power is supplied to the starter motor 12, and the rotation speed of the pinion gear 13 is thereby increased. The more the current to be supplied to the starter motor 12 is increased, the more the rotation speed of the starter motor 12 is increased and the more the rotation speed of the pinion gear 23 is thereby increased. It is therefore possible to estimate the rotation speed of the pinion gear 13 on the basis of the electric power supplying period of time and the magnitude of the supplying current to the starter motor 12.

Figure 6:
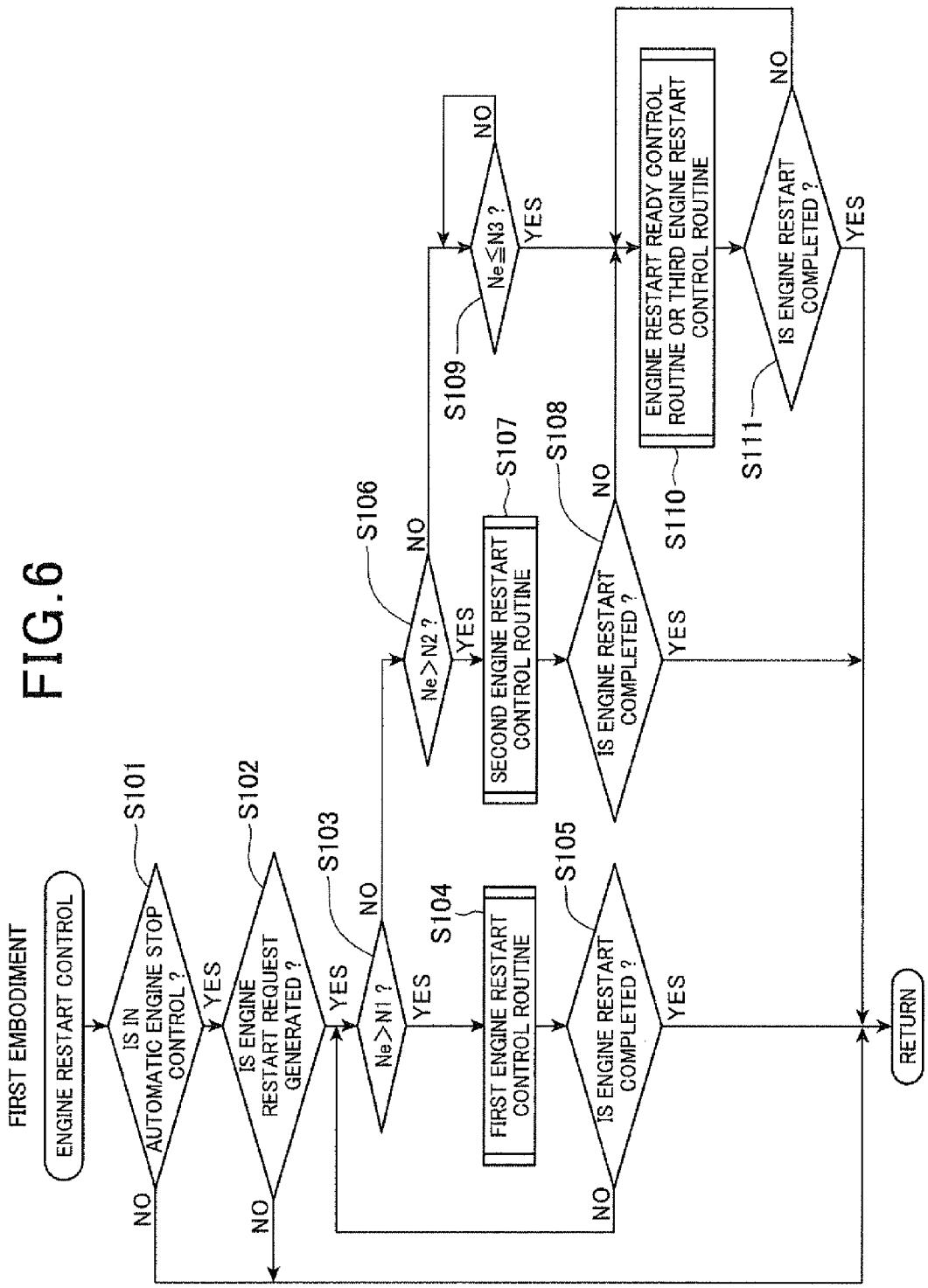
FIG. 6 is a flow chart showing an engine restart control routine executed by the control device according to the first embodiment shown in FIG. 1.

The ECU 20 in the control device according to the first embodiment executes the engine restart control routine shown in FIG. 6 in order to control the restart of the internal combustion engine 21.

FIG. 6 is a flow chart showing the engine restart control routine executed by the control device according to the first embodiment shown in FIG. 1. A description will now be given of the engine restart control routine shown in FIG. 6.

The ECU 20 periodically executes the engine restart control routine shown in FIG. 6 with a predetermined period of time during the power-on period of the ECU 20.

First, in step S101, the ECU 20 detects whether or not the current state of the internal combustion engine 21 is in the automatic engine stop control (for example, during the period of time counted from the combustion-stop of the internal combustion engine 21 to the engine restart).

When the detection result indicates that the internal combustion engine 21 is not in the automatic engine stop control, the ECU 20 completes the engine restart control routine without performing any step other than steps S101 and S102 shown in FIG. 6.

In step S101, when the detection result shows the execution of the automatic engine stop control, the ECU 20 executes the engine restart control by step S102 and following steps.

Firstly, in step S102, the ECU 20 detects whether or not the engine restart request occurs. When the detection result in Step S102 indicates that the engine restart request occurs, the operation flow progresses to step S103. In step S103, the ECU 20 detects whether or not the current engine speed of the internal combustion engine 21 is higher than the first rotation speed N1. That is, the detection in step S103 detects whether or not the current rotation speed Ne of the internal combustion engine 21 is within the first rotation speed range (Ne>N1).

For example, the first rotation speed N1 has a value within the range of 300 to 700 rpm. In the control device according to the first embodiment, the first rotation speed N1 is 500 rpm.

When the rotation speed Ne of the internal combustion engine 21 is higher than the first rotation speed N1 while the rotation speed of the internal combustion engine is dropping, the internal combustion engine 21 can be restarted without performing the cranking and only by restarting its combustion (only by performing its fuel injection and ignition). The current rotation speed Ne is within the range allow to restart the internal combustion engine 21 only by performing the fuel injection and ignition without performing the cranking by the starter 11 because the current rotation speed Ne of the internal combustion engine 21 is higher than the first rotation speed N1 when a value within the rotation speed range of 300 to 700 rpm is set to the first rotation speed N1.

In step S103, in the case in which the detection result indicates that the current rotation speed Ne is higher than the first rotation speed N1 when the engine restart request occurs, (that is, when the engine restart request occurs when the current rotation speed Ne is within the first rotation speed range), the ECU 20 judges for the internal combustion engine 21 to be restarted without performing the cranking by the starter 11. The operation flow progresses to step S104.

In step S104, the ECU 20 executes the first engine restart control in which the ECU 20 performs the fuel injection and ignition in order to restart the internal combustion engine 21 without performing the cranking by the starter 11.

The process in step S104 corresponds to the first engine restart control means.

The operation flow then goes to step S105. In step S105, the ECU 20 detects whether or not the internal combustion engine 21 is restarted on the basis of the current rotation speed Ne of the internal combustion engine 21. That is, the ECU 20 detects whether or not the current rotation speed Ne of the internal combustion engine 21 exceeds an engine start completion detection value.

When the detection result in step S105 indicates that the internal combustion engine 21 is not restarted, the operation flow is returned to step S103. In step S103, the ECU 20 continues the first engine restart control when the current rotation speed Ne of the internal combustion engine 21 is within the first rotation speed range (steps S103 and S104). After this, when the ECU 20 detects that the internal combustion engine 21 has been restarted in step S105, the ECU 20 completes the engine restart control routine shown in FIG. 6.

On the other hand, when the detection result in step S103 indicates that the current rotation speed Ne of the internal combustion engine 21 is not more than the first rotation speed N1, the operation flow goes to step S106.

In step S106, the ECU 20 detects whether or not the current rotation speed Ne of the internal combustion engine 21 is higher than the second rotation speed N2. This detects whether or not the current rotation speed Ne of the internal combustion engine 21 is within the range of the second rotation speed range (N1≥Ne>N2). In the first embodiment, this second rotation speed N2 is a value of 350 rpm which is higher than the third rotation speed N3 by a range of 50 to 150 rpm, for example.

When the detection result in step S106 indicates that the current rotation speed Ne of the internal combustion engine 21 is higher than the second rotation speed N2 at the time when the engine restart request occurs (that is, when the engine restart request occurs when the current rotation speed Ne of the internal combustion engine 21 is within the second rotation speed range, because the rotation speed of the ring gear 23 is high, the ECU 20 judges that it is impossible to smoothly mesh the pinion gear 13 with the ring gear 23 unless the rotation speed of the pinion gear 13 is synchronized with the rotation speed of the ring gear 23. The operation flow then progresses to step S107. In step S107, the ECU 20 executes the second engine restart control.

The ECU 20 performs the second engine restart control by the following steps:

(i1) The rotation speed of the pinion gear 13 is synchronized with the rotation speed of the ring gear 23 by the starter motor 12 in order for the rotation speed of the pinion gear 13 to approach the rotation speed of the ring gear 23, and to decrease a difference in rotation speed between the pinion gear 13 and the ring gear 23; and (i2) After the step (i1), the ECU 20 drives the electromagnetic actuator 14 to mesh the pinion gear 13 with the ring gear 23 in order to perform the cranking between them, and to restart the internal combustion engine 21. The process in step S107 corresponds to the second engine restart control means.

The operation flow goes to step S108. In step S108, the ECU 20 detects whether or not the internal combustion engine 21 is restarted. When the detection result in step S108 indicates that the internal combustion engine 21 is restarted, the ECU 20 completes the engine restart control routine shown in FIG. 6.

On the other hand, when the detection result in step S108 indicates that the internal combustion engine 21 is not restarted, the operation flow progresses to step S110.

On the other hand, when the detection result in step S106 indicates that the current rotation speed Ne of the internal combustion engine 21 is not more than the second rotation speed N2, the operation flow goes to step S109.

In step S109, the ECU 20 detects whether or not the current rotation speed Ne of the internal combustion engine 21 is not more than the third rotation speed N3. This detection judges whether the current rotation speed Ne of the internal combustion engine 21 is within the third rotation speed range (N3≥Ne) or within the rotation speed ready range (N2≥Ne>N3).

For example, it is possible to set a value within the range of 50 rpm to 450 rpm to the third rotation speed N3. In the control device according to the first embodiment, the first rotation speed N3 is 250 rpm.

When the rotation speed Ne of the internal combustion engine 21 is not more than the third rotation speed N3 while the rotation speed of the internal combustion engine is dropping, it is possible to mesh the pinion gear 13 with the ring gear 23 without synchronizing the rotation speed of the pinion gear 13 with the rotation speed of the ring gear 23. That is, it is possible to smoothly mesh the pinion gear 13 with the ring gear 23 without synchronizing the rotation speed of the pinion gear 13 to the rotation speed of the ring gear 23 because the current rotation speed Ne of the internal combustion engine 21 is not more than the third rotation speed N3 when a value within the rotation speed range of 50 rpm to 450 rpm is set to the third rotation speed N3.

When the detection result in step S109 indicates that the current rotation speed Ne of the internal combustion engine 21 is not more than the third rotation speed N3 (that is, when the engine restart request occurs while the current rotation speed Ne of the internal combustion engine 21 is within the third rotation speed range), the ECU 20 judges that it is possible to smoothly mesh the pinion gear 13 with the ring gear 23 without performing any cranking because the rotation speed of the ring gear 23 is low and sufficient to perform the gear engagement. The operation flow thereby progresses to step S110.

In step S110, the ECU 20 executes the third engine restart control. In the third engine restart control, the ECU 20 drives the starter 11 to perform the cranking and restart the internal combustion engine 21 after the ECU 20 drives the electromagnetic actuator 14 to mesh the pinion gear 13 with the ring gear 23 or during the gear meshing operation of the pinion gear 13 and the ring gear 23 by the electromagnetic actuator 14.

The process in step S110 corresponds to the third engine restart control means.

On the other hand, when the detection result in step S109 indicates that the current rotation speed Ne of the internal combustion engine 21 is higher than the third rotation speed N3 (that is, when the engine restart request occurs when the current rotation speed Ne of the internal combustion engine 21 is within the rotation speed ready range), the ECU 20 drives the starter 11 not to perform the cranking process. After this, in step S103, when the detection result in step S109 indicates that the current rotation speed Ne of the internal combustion engine 21 is not more than the third rotation speed N3 (that is, when the current rotation speed Ne of the internal combustion engine 21 is decreased to a value within the third rotation speed range), the operation flow goes to step S110. In step S110, the ECU 20 performs the engine restart ready control. In the engine restart ready control, as in the case for the third engine restart control, the ECU 20 drives the starter 11 to perform the cranking so as to restart the internal combustion engine 21 after the ECU 20 drives the electromagnetic actuator 14 to mesh the pinion gear 13 with the ring gear 23 or during the gear meshing operation of the pinion gear 13 and the ring gear 23 by the electromagnetic actuator 14.

The process in step S110 corresponds also to the engine restart ready control means.

After this, the operation flow goes to step S111. In step S111, the ECU 20 detects whether or not the internal combustion engine 21 has been restarted. When the detection result in step S111 indicates that the internal combustion engine 21 is not restarted, the operation flow is returned to step S100 and the third engine restart control or the engine restart ready control is continuously executed.

After this, when the detection result in step S111 indicates that the internal combustion engine 21 has been restarted, the ECU 20 completes this engine restart control routine shown in FIG. 6.

According to the control device of the first embodiment previously described in detail, the ECU 20 in the control device executes the following controls (j1), (j2), (j3), and (j4):

(j1) The ECU 20 executes the first engine restart control when the engine restart request occurs while the rotation speed of the internal combustion engine is dropping due to the automatic engine stop and the current rotation speed Ne of the internal combustion engine 21 is a value within the first rotation speed range. In the first engine restart control, the ECU 20 restarts the internal combustion engine 21 by restarting the fuel injection and ignition without performing the cranking by the starter 11.

(j2) The ECU 20 executes the second engine restart control when the engine restart request occurs while the current rotation speed Ne of the internal combustion engine 21 is a value within the second rotation speed range. In the second engine restart control, the rotation speed of the pinion gear 13 is synchronized with the rotation speed of the ring gear 23 in order to perform the cranking by the starter 11 and to restart the internal combustion engine 21.

(j3) The ECU 20 executes the third engine restart control when the engine restart request occurs while the current rotation speed Ne of the internal combustion engine 21 is a value within the third rotation speed range. In the third engine restart control, the ECU 20 drives the starter 11 to perform the cranking and restart the internal combustion engine 21 after the pinion gear 13 is meshed with the ring gear 23 or during the gear meshing operation of the pinion gear 13 and the ring gear 23 by the electromagnetic actuator 14.

(j4) The ECU 20 executes the engine restart ready control when the engine restart request occurs when the current rotation speed Ne of the internal combustion engine 21 is a value within the rotation speed ready range which is set between the second rotation speed range and the third rotation speed range. In the engine restart ready control, the ECU 20 firstly drives the starter 11 not to perform any cranking. After this, the ECU 20 drives the starter 11 to perform the cranking when the current rotation speed Ne of the internal combustion engine 21 is a value within the third rotation speed range in order to restart the internal combustion engine 2L The above controls (j1) to (j4) make it possible to correctly, smoothly, and optimally execute the engine restart control on the basis of the current rotation speed Ne of the internal combustion engine 21 when the engine restart request occurs while the rotation speed of the internal combustion engine is dropping due to the automatic engine stop. This engine restart control makes it possible to prevent the engine restart operation from being delayed, gear meshing noises from being increased, and possible to decrease the power consumption of the starter 11.

Further, the control device comprised of the ECU 20 according to the first embodiment estimates the rotation speed of the internal combustion engine 21 on the basis of the elapsed period of time counted from the time when the automatic engine stop request occurs (or when the combustion of the internal combustion engine 21 is stopped) during the automatic engine restart control. It is therefore not necessary for the control device to have an expensive crank angle sensor capable of detecting the rotation speed of the internal combustion engine 21 with high accuracy.

Still further, the control device according to the first embodiment having the ECU 20 estimates the rotation speed of the pinion gear 13 on the basis of the electric power period of time and the period of flowing current in the starter motor 12, it is therefore possible to eliminate the sensor to detect the rotation speed of the starter motor 12 (namely, the rotation speed of the pinion gear 13). This makes it possible to satisfy the recent trend to decrease the manufacturing cost.

The control device according to the first embodiment has the configuration to execute the first engine restart control, the second engine restart control, the third engine restart control, and the engine restart ready control. The present invention is not limited by this configuration of the control device. It is possible to eliminate the first engine restart control, that is, to have the configuration in which the control device can only execute the second engine restart control, the third engine restart control, and the engine restart ready control.

Second Embodiment

A description will be given of the control device according to the second embodiment of the present invention with reference to FIG. 7 and FIG. 8.

The difference between the second embodiment and the first embodiment will be explained below.

Figure 7:
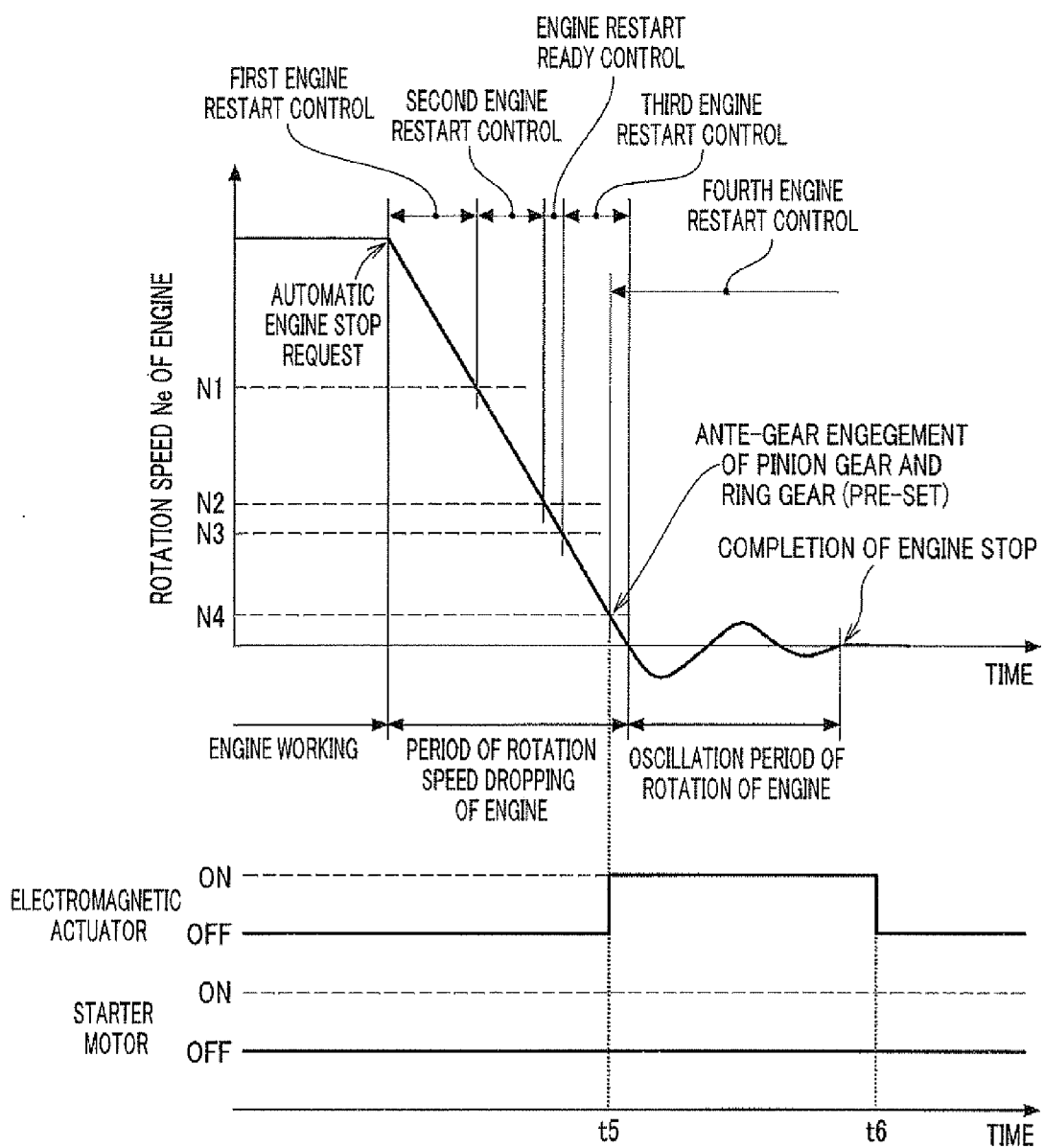
FIG. 7 is a timing chart showing an engine restart control by the control device according to a second embodiment of the present invention.

FIG. 7 is a timing chart showing the engine restart control executed by the ECU 20 in the control device according to the second embodiment of the present invention. FIG. 8 is a flow chart showing the engine restart control routine executed by the ECU 20 in the control device according to the second embodiment.

Figure 8:
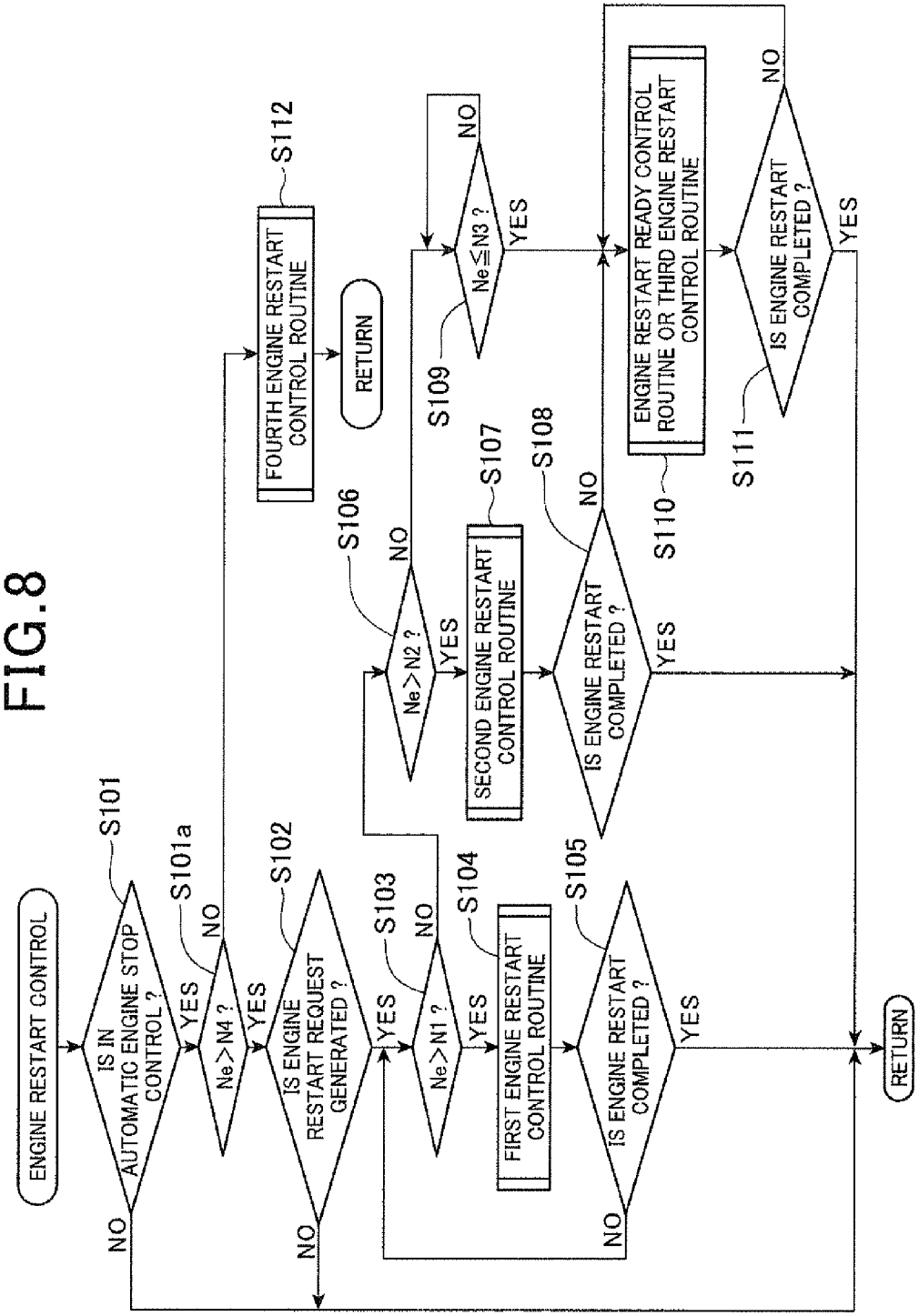
FIG. 8 is a flow chart showing an engine restart control routine by the control device according to the second embodiment of the present invention.
Figure 9:
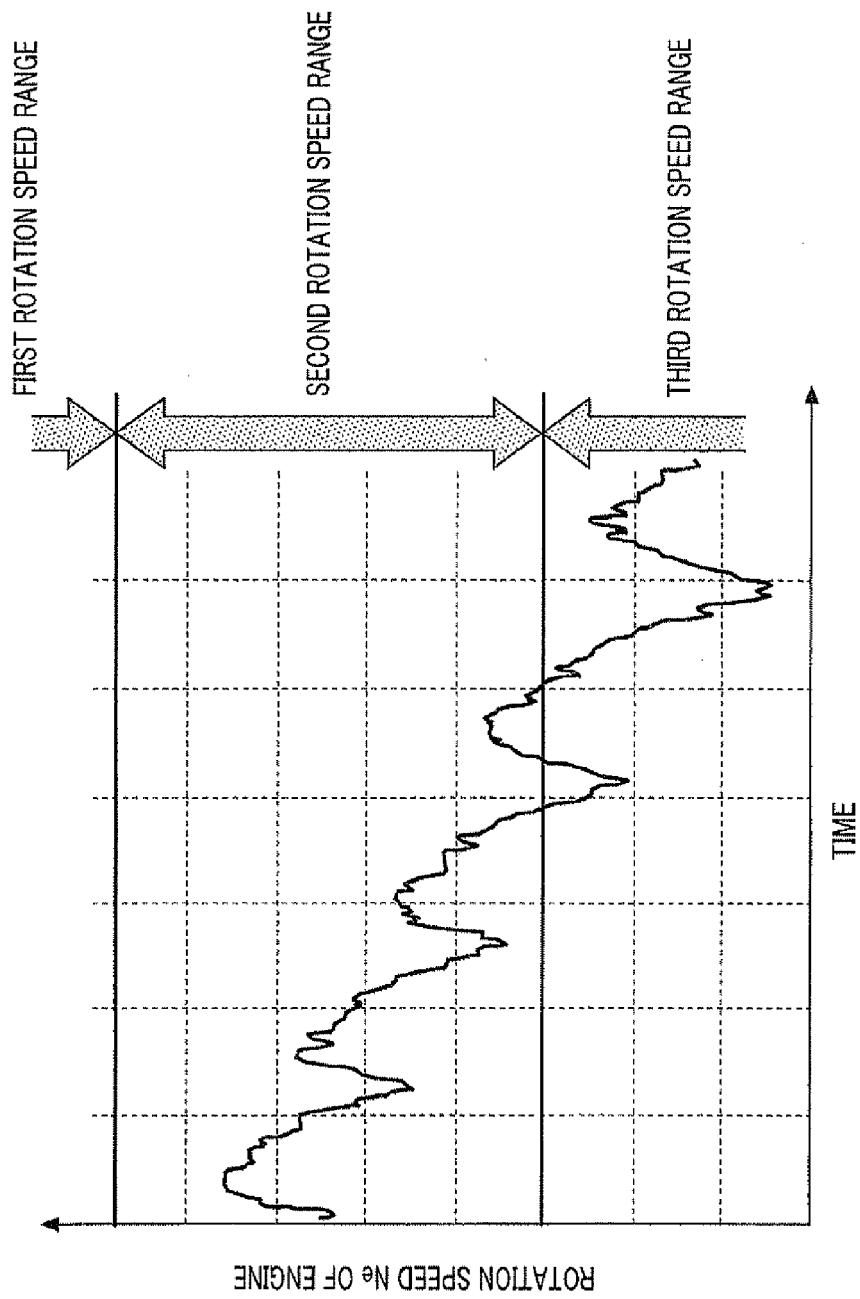
FIG. 9 is a timing chart showing a problem caused by the engine restart control.

The ECU 20 executes the engine restart control routine shown in FIG. 8. The ECU 20 in the control device according to the second embodiment executes a fourth engine restart control when no engine restart request occurs and the current rotation speed Ne of the internal combustion engine 21 is decreased toward and finally reaches a fourth rotation speed N4. This fourth rotation speed N4 is a value (e.g. 100 rpm) immediately before the completion of the engine stop (Ne=0).

In the fourth engine restart control, when the rotation speed Ne of the internal combustion engine 21 is decreased toward and finally reaches the fourth rotation speed N4 (e.g. 100 rpm), the ECU 20 drives the electromagnetic actuator 14 to perform the gear meshing operation to mesh the pinion gear 13 with the ring gear 23. After this, when the engine restart request occurs, the ECU 20 then drives the starter 11 to rotate the pinion gear 13 by the starter motor 12 in order to perform the cranking and restart the internal combustion engine 21.

In particular, the ECU 20 drives the electromagnetic actuator 14 to be electrically turned on in order to mesh the pinion gear 13 with the ring gear 23 at the time t5 when the rotation speed Ne of the internal combustion engine 21 is decreased to and reaches the fourth rotation speed N4 (e.g. 100 rpm).

The ECU 20 judges that the pinion gear 13 is correctly meshed with the ring gear 23 at a time t6 even if the electromagnetic actuator 14 is electrically turned off because the time t6 is a predetermined period of time which is a necessary period of time to correctly complete the gear meshing operation to mesh the pinion gear 13 with the ring gear 23. This necessary period of time for the gear meshing operation is counted from the time when the electromagnetic actuator 14 is electrically turned on. The ECU 20 drives the electromagnetic actuator 14 to be electrically turned off at the time t6. After this, when the engine restart request occurs, the ECU 20 drives the electromagnetic actuator 14 to be electrically turned on, and drives the starter motor 12 in the starter 11 to be electrically turned on in order to rotate the pinion gear 13 and to perform the cranking by the starter 11. This makes it possible to restart the internal combustion engine 21.

The above engine restart control performed by the control device according to the second embodiment makes it possible to mesh the pinion gear 13 with the ring gear 23 before starting the oscillating motion of the internal combustion engine 21. That is, during the oscillating motion, the internal combustion engine 21 rotates forwardly and backwardly immediately before completion of the engine stop. The control device can avoid the gear meshing operation between the pinion gear 13 and the ring gear 23 from being performed during the oscillation motion of the internal combustion engine 21. This makes it possible to prevent gear meshing noises from being generated and increased, and prevent the starter 11 from being damaged.

The ECU 20 drives the starter 11 to start the cranking at the time when the engine restart request occurs after the rotation speed Ne of the internal combustion engine 21 is decreased to a value of not more than the fourth rotation speed N4 (e.g. 100 rpm). It is thereby possible for the ECU 20 in the control device to perform the rapid engine restart of the internal combustion engine 21 immediately when the engine restart request occurs.

A description will now be given of the engine restart control routine shown in FIG. 8 executed by the ECU 20 in the control device according to the second embodiment.

In step S101 of the engine restart control routine shown in FIG. 8, the ECU 20 detects whether or not the internal combustion engine 21 is currently controlled by the automatic engine stop control. When the detection result in step S101 indicates that the internal combustion engine 21 is currently controlled by the automatic engine stop control. The operation flow goes to step S101a.

In step S101a, the ECU 20 detects whether or not the current rotation speed Ne of the internal combustion engine 21 is more than the fourth rotation speed N4. This fourth rotation speed N4 is a rotation speed of 100 rpm which is a value immediately before a value (Ne=0) of the complete engine stop. The control device according to the second embodiment uses 100 rpm as the fourth rotation speed N4.

When the detection result in step S101a indicates that the current rotation speed Ne of the internal combustion engine 21 is higher than the fourth rotation speed N4. The operation flow goes to step S102. In step S102, the ECU 20 detects whether or not the engine restart request has occurred.

After this, when the ECU 20 detects that current rotation speed Ne of the internal combustion engine 21 is higher than the first rotation speed N1 at the time when the engine restart request occurs (that is, when the engine restart request occurs in the condition in which the current rotation speed Ne of the internal combustion engine 21 is within the first rotation speed range), the ECU 20 executes the first engine restart control to restart the internal combustion engine 21 (step S104 and step S105).

Further, when the ECU 20 detects that current rotation speed Ne of the internal combustion engine 21 is higher than the second rotation speed N2 in step S106 at the time when the engine restart request occurs (that is, when the engine restart request occurs while the current rotation speed Ne of the internal combustion engine 21 is a value within the second rotation speed range), the ECU 20 executes the second engine restart control to restart the internal combustion engine 21 (step S107 and step S108).

Further, when the ECU 20 detects that current rotation speed Ne of the internal combustion engine 21 is not more than the third rotation speed N3 in step S109 at the time when the engine restart request occurs (that is, when the engine restart request occurs while the current rotation speed Ne of the internal combustion engine 21 is a value within the third rotation speed range), the ECU 20 executes the third engine restart control to restart the internal combustion engine 21 (step S110 and step S111).

Still further, when the ECU 20 detects that current rotation speed Ne of the internal combustion engine 21 is higher than the third rotation speed N3 in step S109 at the time when the engine restart request occurs (that is, when the engine restart request occurs while the current rotation speed Ne of the internal combustion engine 21 is within the rotation speed ready range), the ECU 20 does not instruct the starter 11 to perform the cranking, and after this, the ECU 20 executes the engine restart ready control to restart the internal combustion engine 21 (step S110 and step S111) when the detection result in step S109 indicates that the current rotation speed Ne of the internal combustion engine 21 is further decreased and finally reaches a value of not more than the third rotation speed N3.

On the other hand, when the detection result in step S101a indicates that the current rotation speed Ne of the internal combustion engine 21 is not more than the fourth rotation speed N4 (that is, when the current rotation speed Ne of the internal combustion engine 21 is a value of not more than the fourth rotation speed N4 without generating any engine restart request), the operation flow goes to step S112. In step S112, the ECU 20 executes the fourth engine restart control.

In the fourth engine restart control, the ECU 20 drives the electromagnetic actuator 14 to be electrically turned on in order to perform the gear meshing operation to mesh the pinion gear 13 with the ring gear 23 when the rotation speed Ne of the internal combustion engine 21 is gradually decreased toward and finally reaches the fourth rotation speed N4 (e.g. 100 rpm at the time t5 shown in FIG. 7). After this, the ECU 20 drives the starter motor 12 in the starter 11 to be electrically turned on in order to rotate the pinion gear 13 and to perform the cranking. This makes it possible to restart the internal combustion engine 21.

According to the second embodiment described above, the ECU 20 in the control device drives the electromagnetic actuator 14 in order to perform the gear meshing operation to mesh the pinion gear 13 with the ring gear 23 when the rotation speed Ne of the internal combustion engine 21 is gradually decreased to and finally reaches the fourth rotation speed N4 if no engine restart request occurs.

The above engine restart control according to the second embodiment makes it possible to mesh the pinion gear 13 with the ring gear 23 before the oscillating motion of rotation of the internal combustion engine 21 (in which the internal combustion engine 21 rotates forwardly and backwardly) immediately before completion of the engine stop, and to avoid the pinion gear 13 and the ring gear 23 from being meshed together during the oscillation motion of the internal combustion engine 21. This makes it possible to prevent gear meshing noises from being generated and increased, and prevent the starter 11 from being damaged.

The ECU 20 drives the starter 11 to start the cranking at the time when the engine restart request occurs after the rotation speed Ne of the internal combustion engine 21 is decreased to a value of not more than the fourth rotation speed N4. It is thereby possible for the ECU 20 to rapidly restart the internal combustion engine 21 when the engine restart request occurs.

Still further, in the fourth engine restart control executed by the control device according to the second embodiment, the ECU 20 in the control device drives the electromagnetic actuator 14 to be electrically turned on at the time when the current rotation speed Ne of the internal combustion engine 21 is decreased and reaches the fourth rotation speed N4. The ECU 20 then drives the electromagnetic actuator 14 to be electrically turned off at the time when the predetermined period of time is elapsed after the turned-on of the electromagnetic actuator 14. This makes it possible to keep the turned-off condition of the electromagnetic actuator 14 until the engine restart request occurs and the starter 11 timely executes the cranking, and therefore possible to decrease the electric power consumption of the starter 11.

In the engine restart control performed by the ECU 20 in the control device according to the second embodiment, the electromagnetic actuator 14 is electrically turned on when the ECU 20 starts the fourth engine restart control. After this, the electromagnetic actuator 14 is electrically turned off when the predetermined period of time is elapsed. However, the present invention is not limited by this. It is possible for the control device to have a sensor capable of directly detecting the gear meshed condition between the pinion gear 13 and the ring gear 23, and to electrically turn off the electromagnetic actuator 14 on the basis of the detection result of this sensor.

Still further, the ECU 20 in the control device according to the second embodiment executes all of the first engine restart control, the second engine restart control, the third engine restart control, the fourth engine restart control, and the engine restart ready control. However, the present invention is not limited by this. For example, it is possible for the ECU 20 in the control device to execute the second engine restart control, the third engine restart control, the fourth engine restart control, and the engine restart ready control other than the first engine restart control.

Third Embodiment

A description will be given of the control device according to the third embodiment of the present invention with reference to FIG. 10 and FIG. 11. The difference between the third embodiment and the first embodiment will be explained below.

Figure 10:
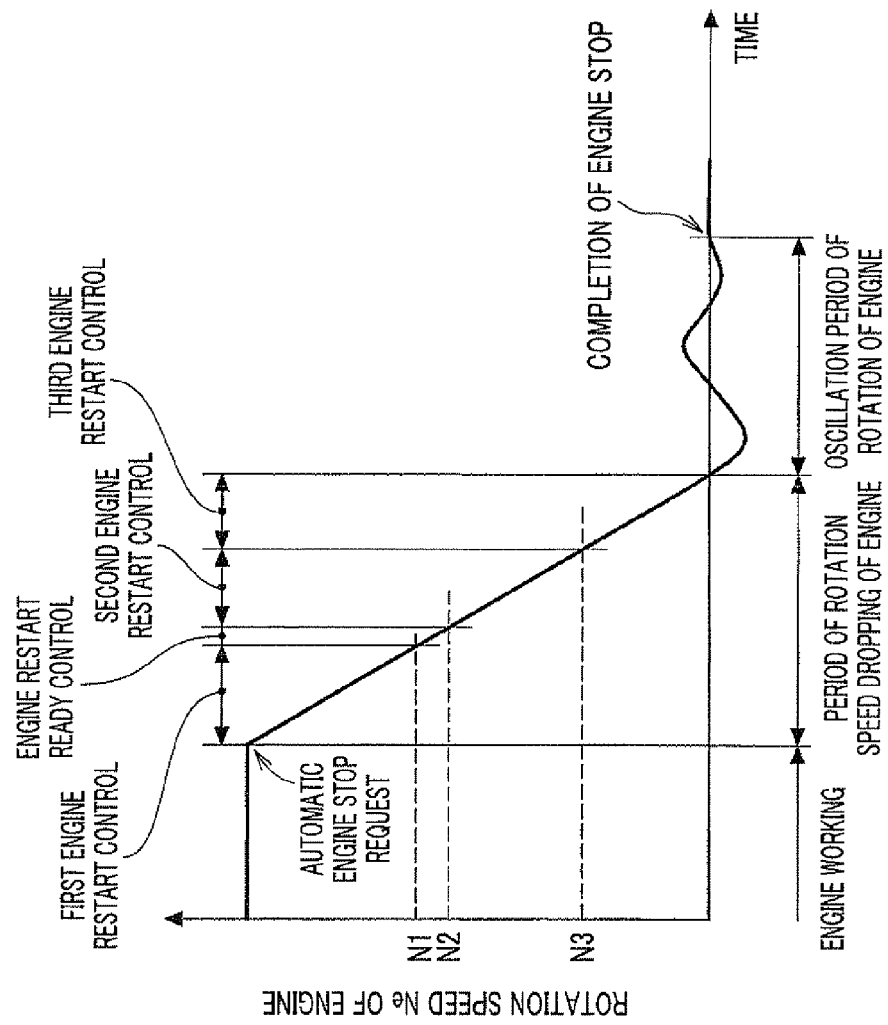
FIG. 10 is a timing chart showing an engine restart control performed by the control device according to a third embodiment of the present invention.
Figure 11:
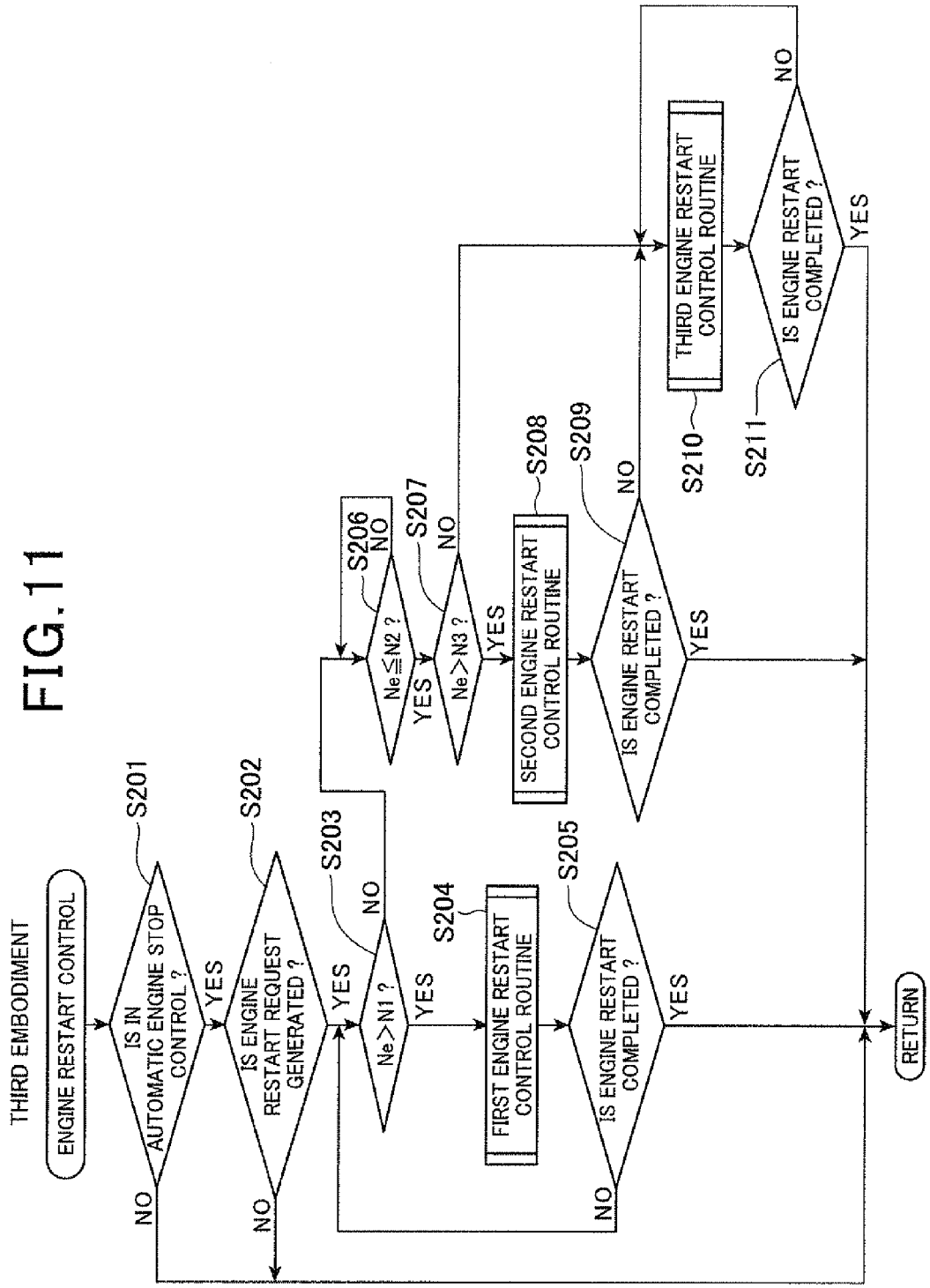
FIG. 11 is a flow chart showing an engine restart control routine executed by the control device according to the third embodiment.

FIG. 10 is a timing chart showing the engine restart control executed by the ECU 20 in the control device according to the third embodiment of the present invention. FIG. 11 is a flow chart showing the engine restart control routine executed by the ECU 20 in the control device according to the third embodiment.

As shown in the time chart of FIG. 10, the ECU 20 in the control device according to the third embodiment executes the engine restart ready control while the current rotation speed Ne of the internal combustion engine 21 is within the rotation speed ready range (N1≥Ne>N2) and when the engine restart request occurs while the rotation speed of the internal combustion engine is dropping due to the automatic engine stop of the internal combustion engine 21. As shown in FIG. 10, the rotation speed ready range (N1≥Ne>N2) used in the third embodiment is not more than the first rotation speed N1 and higher than the second rotation speed N2 (e.g. 400 rpm).

In the rotation speed ready range (N1≥Ne>N2) used in the third embodiment, the ECU 20 drives the starter 11 not to perform the cranking. After this, when the rotation speed Ne of the internal combustion engine 21 is within a predetermined condition (N2≥Ne>N3) which is not more than the second rotation speed N2 and higher than the third rotation speed N3, the ECU 20 drives the starter motor 12, as in the case for the second engine restart control, to synchronize the rotation speed of the pinion gear 13 with the rotation speed of the ring gear 23 in order to decrease the difference in rotation speed between the pinion gear 12 and the ring gear 23. The ECU 20 then drives the electromagnetic actuator 14 to perform the gear meshing operation to mesh the pinion gear 13 with the ring gear 23 in order to perform the cranking and restart the internal combustion engine 21.

A description will now be given of the engine restart control routine performed by the ECU 20 in the control device according to the third embodiment with reference to FIG. 11.

In step S201 in the engine restart control routine, the ECU 20 detects whether or not the current state of the internal combustion engine 21 is in the automatic engine stop control.

When the detection result in step S201 indicates that the internal combustion engine 21 is in the automatic engine stop control, the operation flow goes to step S202. In step S202, the ECU 20 detects whether or not the engine restart request occurs. When the detection result indicates that the engine restart request occurs ("Yes" in step S202), the operation flow goes to step S203.

In step S203, the ECU 20 detects whether or not the rotation speed Ne of the internal combustion engine 21 is higher than the first rotation speed N1.

When the detection result in step S203 indicates that the current rotation speed Ne of the internal combustion engine 21 is higher than the first rotation speed N1 at the time when the engine restart request occurs (that is, when the engine restart request occurs while the rotation speed Ne of the internal combustion engine 21 is within the first rotation speed range), the ECU 20 executes the first engine restart control in order to restart the fuel injection and engine combustion without performing any cranking, that is, without driving the starter 11 to perform the cranking. This control restarts the internal combustion engine 21 (step S204, step S205).

On the other hand, when the detection result in step S203 indicates that the rotation speed Ne of the internal combustion engine 21 is not more than the first rotation speed N1, the operation flow goes to step S206.

In step S206, the ECU 20 detects whether or not the current rotation speed Ne of the internal combustion engine 21 is not more than the second rotation speed N2. When the detection result in step S206 indicates that the current rotation speed Ne of the internal combustion engine 21 is not more than the second rotation speed N2, the operation flow goes to step S207.

In step S207, the ECU 20 detects whether or not the current rotation speed Ne of the internal combustion engine 21 is higher than the third rotation speed N3.

When the detection result in step S206 indicates that the rotation speed Ne of the internal combustion engine 21 is higher than the third rotation speed N3 and the engine restart request occurs (that is, when the engine restart request occurs while the current rotation speed Ne of the internal combustion engine 21 is within the second rotation speed range), the ECU 20 executes the second engine restart control. In this second engine restart control, the ECU 20 drives the starter motor 12 to synchronize the rotation speed of the pinion gear 13 with the rotation speed of the ring gear 23 in order to decrease the difference in rotation speed between the pinion gear 12 and the ring gear 23. The ECU 20 then drives the electromagnetic actuator 14 to perform the gear meshing operation to mesh the pinion gear 13 with the ring gear 23 in order to restart the cranking and thereby restart the internal combustion engine 21 (step S208, step S209).

On the other hand, when the detection result in step S206 indicates that the rotation speed Ne of the internal combustion engine 21 is higher than the second rotation speed N2 and the engine restart request occurs (that is, when the engine restart request occurs while the current rotation speed Ne of the internal combustion engine 21 is within the rotation speed ready range used in the third embodiment), the ECU 20 does not perform any cranking, that is, does not instruct the starter 11 to perform the cranking. After this, when the detection result in step S206 indicates that the rotation speed Ne of the internal combustion engine 21 is not more than the second rotation speed N2, the ECU 20 executes the engine restart ready control. The ECU 20 further drives the starter 11, as in the case for the second engine restart control, to synchronize the rotation speed of the pinion gear 13 with the rotation speed of the ring gear 23 in order to decrease the difference in rotation speed between the pinion gear 12 and the ring gear 23. The ECU 20 then drives the electromagnetic actuator 14 to mesh the pinion gear 13 with the ring gear 23 in order to restart the cranking and thereby restart the internal combustion engine 21 (step S208, step S209).

On the other hand, when the detection result in step S207 indicates that the rotation speed Ne of the internal combustion engine 21 is not more than the third rotation speed N3 and the engine restart request occurs (that is, when the engine restart request occurs while the current rotation speed Ne of the internal combustion engine 21 is within the third rotation speed range), the ECU 20 executes the third engine restart control. In the third engine restart control, the ECU 20 then drives the electromagnetic actuator 14 to mesh the pinion gear 13 with the ring gear 23. After completion of this gear meshing operation or during this gear meshing operation, the ECU 20 restarts the cranking and thereby restart the internal combustion engine 21 (step S210, step S211).

As described above in detail, the control device according to the third embodiment uses the rotation speed ready range which is set between the first rotation speed range and the second rotation speed range.

When the engine restart request occurs in the rotation speed ready range used in the third embodiment, and the ECU 20 does not instruct the starter 11 to perform the cranking. After this, when the rotation speed Ne of the internal combustion engine 21 is within the second rotation speed range, the ECU 20 drives the starter 12, as in the case for the second engine restart control, to synchronize the rotation speed of the pinion gear 13 with the rotation speed of the ring gear 23 in order to decrease the difference in rotation speed between the pinion gear 12 and the ring gear 23. The ECU 20 then drives the electromagnetic actuator 14 to mesh the pinion gear 13 with the ring gear 23 in order to restart the cranking and thereby restart the internal combustion engine 21.

Accordingly, even if the engine restart request occurs in the rotation speed ready range used in the third embodiment which is set between the first rotation speed range and the second rotation speed range, it is possible for the ECU 20 to smoothly restart the internal combustion engine 21 without performing any complicated engine restart control which requires estimating the rotation speed Ne of the internal combustion engine 21. In this case, even if the engine restart request occurs while the rotation speed Ne of the internal combustion engine 21 is within the rotation speed ready range, the ECU 20 drives the starter 11 to perform the cranking after the rotation speed Ne of the internal combustion engine 21 is within the second rotation speed range. Because the time period in which the rotation speed Ne of the internal combustion engine 21 passes the rotation speed ready range is short, it is possible to minimize the delay period of time counted from the time when the engine restart request occurs to the time when the internal combustion engine 21 is restarted, and to set the delay period of time to an optimum value within an allowable delay period of time.

The ECU 20 in the control device according to the third embodiment executes the first engine restart control, the second engine restart control, the third engine restart control, and the engine restart ready control. The present invention is not limited by the third embodiment. It is possible for the ECU 20 in the control device to execute the fourth engine restart control in addition to first engine restart control, the second engine restart control, the third engine restart control, and the engine restart ready control.

Fourth Embodiment

A description will be given of the control device according to the fourth embodiment of the present invention with reference to FIG. 12 and FIG. 13. The difference between the fourth embodiment and the first embodiment will be explained below.

Figure 12:
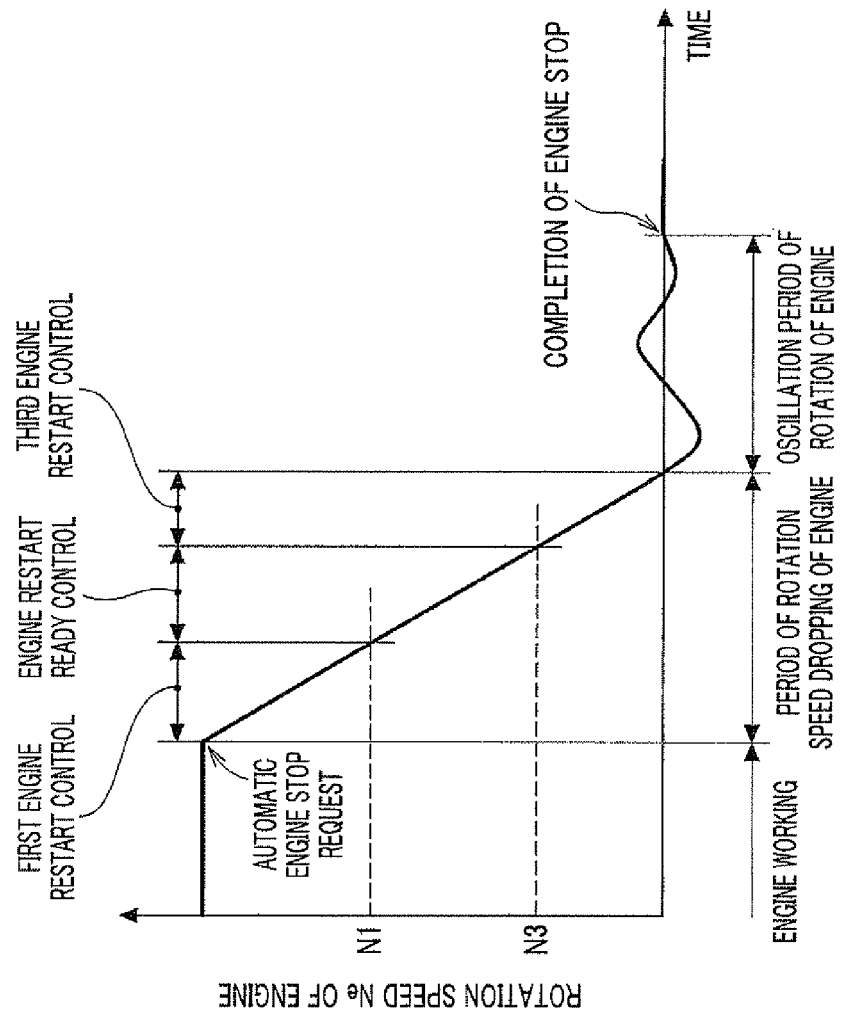
FIG. 12 is a timing chart showing an engine restart control performed by the control device according to a fourth embodiment of the present invention.

FIG. 12 is a timing chart showing the engine restart control executed by the ECU 20 in the control device according to the fourth embodiment of the present invention. FIG. 13 is a flow chart showing the engine restart control routine executed by the ECU 20 in the control device according to the fourth embodiment.

Figure 13:
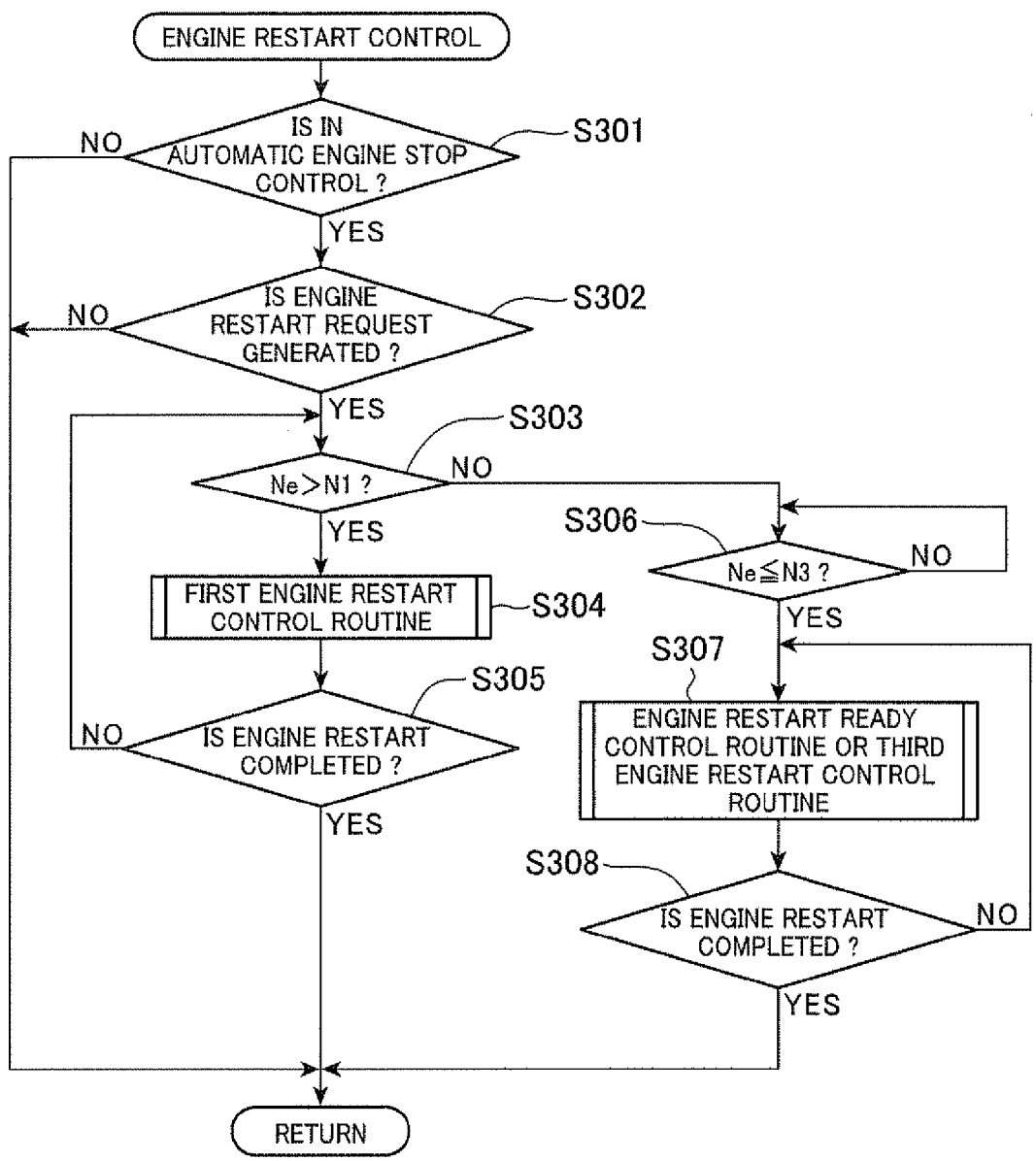
FIG. 13 is a flow chart showing an engine restart control routine executed by the control device according to the fourth embodiment.

The ECU in the control device according to the fourth embodiment executes the engine restart control routine shown in FIG. 13 while the current rotation speed Ne of the internal combustion engine 21 is within the rotation speed ready range (N1≥Ne>N3) when the engine restart request occurs while the rotation speed of the internal combustion engine is dropping due to the automatic engine stop of the internal combustion engine 21. This rotation speed ready range (N1≥Ne>N3) in the fourth embodiment is set to a range which is not more than the first rotation speed N1 and higher than the third rotation speed N3.

In the rotation speed ready range (N1≥Ne>N3) in the fourth embodiment, the ECU 20 drives the starter 11 not to perform the cranking. After this, when the rotation speed Ne of the internal combustion engine 21 is within a predetermined condition (N2≥Ne>N3) which is not more than the third rotation speed N3, the ECU 20 drives the starter motor 12, as in the case for the third engine restart control, to synchronize the rotation speed of the pinion gear 13 with the rotation speed of the ring gear 23 in order to decrease the difference in rotation speed between the pinion gear 12 and the ring gear 23. The ECU 20 then drives the electromagnetic actuator 14 to perform the gear meshing operation to mesh the pinion gear 13 with the ring gear 23. The ECU 20 drives the starter 11 to perform the cranking and restart the internal combustion engine 21 after completion of the gear meshing operation or during the gear meshing operation.

A description will now be given of the engine restart control routine performed by the ECU 20 in the control device according to the fourth embodiment with reference to FIG. 13.

In step S301 in the engine restart control routine, the ECU 20 detects whether or not the current state of the internal combustion engine 21 is in the automatic engine stop control.

When the detection result in step S301 indicates that the internal combustion engine 21 is in the automatic engine stop control, the operation flow goes to step S302. In step S302, the ECU 20 detects whether or not the engine restart request occurs. When the detection result indicates that the engine restart request occurs ("Yes" in step S302), the operation flow goes to step S303.

In step S303, the ECU 20 detects whether or not the rotation speed Ne of the internal combustion engine 21 is higher than the first rotation speed N1.

When the detection result in step S303 indicates that the current rotation speed Ne of the internal combustion engine 21 is higher than the first rotation speed N1 ("Yes" in step S303) at the time when the engine restart request occurs (that is, when the engine restart request occurs while the rotation speed Ne of the internal combustion engine 21 is within the first rotation speed range), the operation flow gesso to step S304. In step S304, the ECU 20 executes the first engine restart control in order to restart the fuel injection and engine combustion without performing any cranking, that is, without driving the starter 11 to perform the cranking. This control restarts the internal combustion engine 21 (step S304, step S305).

On the other hand, the detection result in step S303 indicates that the rotation speed Ne of the internal combustion engine 21 is not more than the first rotation speed N1 ("No" in step S303), the operation flow goes to step S306.

In step S306, the ECU 20 detects whether or not the current rotation speed Ne of the internal combustion engine 21 is not more than the third rotation speed N3. When the detection result in step S306 indicates that the current rotation speed Ne of the internal combustion engine 21 is not more than the third rotation speed N3 ("Yes" in step S306), the operation flow goes to step S307.

In step S307, when the detection result in step S306 indicates that the rotation speed Ne of the internal combustion engine 21 is not more than the third rotation speed N3 and when the engine restart request occurs (that is, when the engine restart request occurs while the current rotation speed Ne of the internal combustion engine 21 is within the third rotation speed range), the ECU 20 executes the third engine restart control. On performing the third engine restart control, the ECU 20 drives the starter motor 12 to synchronize the rotation speed of the pinion gear 13 with the rotation speed of the ring gear 23 in order to decrease the difference in rotation speed between the pinion gear 12 and the ring gear 23. After this, the ECU 20 then drives the electromagnetic actuator 14 to perform the gear meshing operation to mesh the pinion gear 13 with the ring gear 23. The ECU 20 drives the starter 11 to restart the cranking in order to restart the internal combustion engine 21 after completion of gear meshing operation or during the gear meshing operation (step S307, step S308).

On the other hand, when the detection result in step S306 indicates that the rotation speed Ne of the internal combustion engine 21 is higher than the third rotation speed N3 ("No" in step S306) at the time when the engine restart request occurs (that is, when the engine restart request occurs while the current rotation speed Ne of the internal combustion engine 21 is within the rotation speed ready range used in the fourth embodiment), the ECU 20 does not perform any cranking, that is, does not instruct the starter 11 to perform the cranking.

After this, the ECU 20 continues the detection in step S306 until the detection result in step S306 indicates that the rotation speed Ne of the internal combustion engine 21 is a value of not more than the third rotation speed N3. When the detection result in step S306 indicates that the rotation speed Ne of the internal combustion engine 21 is a value of not more than the third rotation speed N3 (that is, the current rotation speed Ne of the internal combustion engine 21 is decreased and reaches a value within the third rotation speed N3), the ECU 20 executes the engine restart ready control, and drives the starter motor 12, as in the case for the third engine restart control, to synchronize the rotation speed of the pinion gear 13 with the rotation speed of the ring gear 23 in order to decrease the difference in rotation speed between the pinion gear 12 and the ring gear 23. The ECU 20 then drives the electromagnetic actuator 14 to perform the gear meshing operation to mesh the pinion gear 13 with the ring gear 23 in order to restart the cranking and thereby restart the internal combustion engine 21 (step S307, step S308).

As described above in detail, the control device according to the fourth embodiment uses the rotation speed ready range which is set between the first rotation speed range and the third rotation speed range.

When the engine restart request occurs in the rotation speed ready range used in the fourth embodiment, the ECU 20 does not instruct the starter 11 to perform the cranking. After this, when the rotation speed Ne of the internal combustion engine 21 is within the third rotation speed range, the ECU 20 drives the starter motor 12, as in the case for the third engine restart control, to synchronize the rotation speed of the pinion gear 13 with the rotation speed of the ring gear 23 in order to decrease the difference in rotation speed between the pinion gear 12 and the ring gear 23. The ECU 20 then drives the electromagnetic actuator 14 to perform the gear meshing operation to mesh the pinion gear 13 with the ring gear 23 in order to restart the cranking and thereby restart the internal combustion engine 21.

Accordingly, even if the engine restart request occurs during the rotation speed ready range which is set between the first rotation speed range and the third rotation speed range, it is possible for the ECU 20 to smoothly restart the internal combustion engine 21 without performing any complicated engine restart control which requires estimating the rotation speed Ne of the internal combustion engine 21. In this case, even if the engine restart request occurs while the rotation speed Ne of the internal combustion engine 21 is within the rotation speed ready range, the ECU 20 drives the starter 11 to perform the cranking after the rotation speed Ne of the internal combustion engine 21 is within the second rotation speed range. Because the period of time for the rotation speed Ne of the internal combustion engine 21 to pass the rotation speed ready range used in the fourth embodiment is short, it is possible to minimize the delay period of time counted from the time when the engine restart request occurs to the time when the internal combustion engine 21 is restarted within an allowable delay period of time.

The ECU 20 in the control device according to the fourth embodiment executes the first engine restart control, the third engine restart control, and the engine restart ready control. The present invention is not limited by the fourth embodiment. It is possible for the ECU 20 in the control device to execute the fourth engine restart control in addition to the first engine restart control, the third engine restart control, and the engine restart ready control.

By the way, the control device according to the first to fourth embodiments estimates (or calculates) the current rotation speed Ne of the internal combustion engine 21 on the basis of the elapsed period of time counted from the time when the automatic engine stop request occurs (or the time when the combustion of the internal combustion engine 21 is stopped), and also estimates (or calculates) the rotation speed of the pinion gear on the basis of the supplying period of time to supply electric power to the starter motor 12 and the magnitude of the supplying current. The present invention is not limited by this. For example, it is possible for the ECU 20 to detect the current rotation speed Ne of the internal combustion engine 21 on the basis of a crank angle signal detected by and transferred from a crank angle sensor, and detect the rotation speed of the pinion gear 13 on the basis of the received crank angle signal in order to detect the rotation speed of the starter motor 12 (or the rotation speed of the pinion gear 13).

Fifth Embodiment

A description will be given of the control device according to the fifth embodiment of the present invention with reference to FIG. 14 and FIG. 15.

Figure 14:
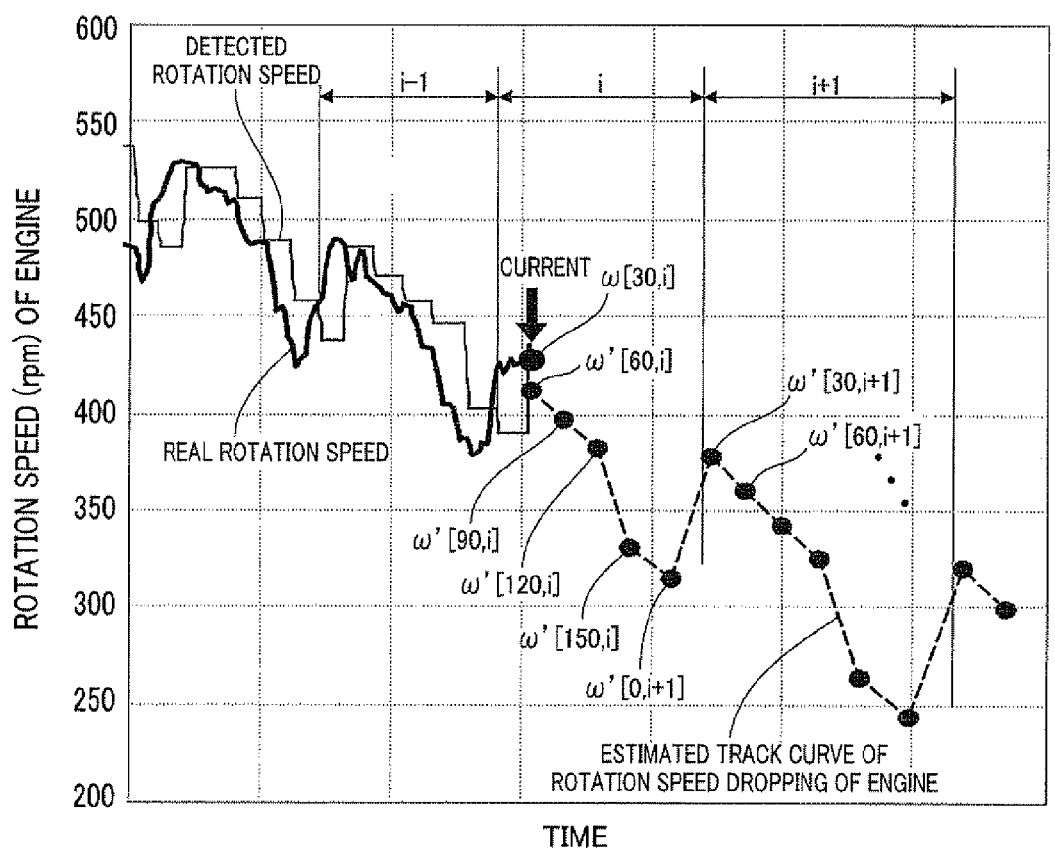
FIG. 14 is a view showing an estimated track curve when the rotation speed of the internal combustion engine is decreased after automatic engine stop obtained by the control device according to a fifth embodiment of the present invention.
Figure 16:
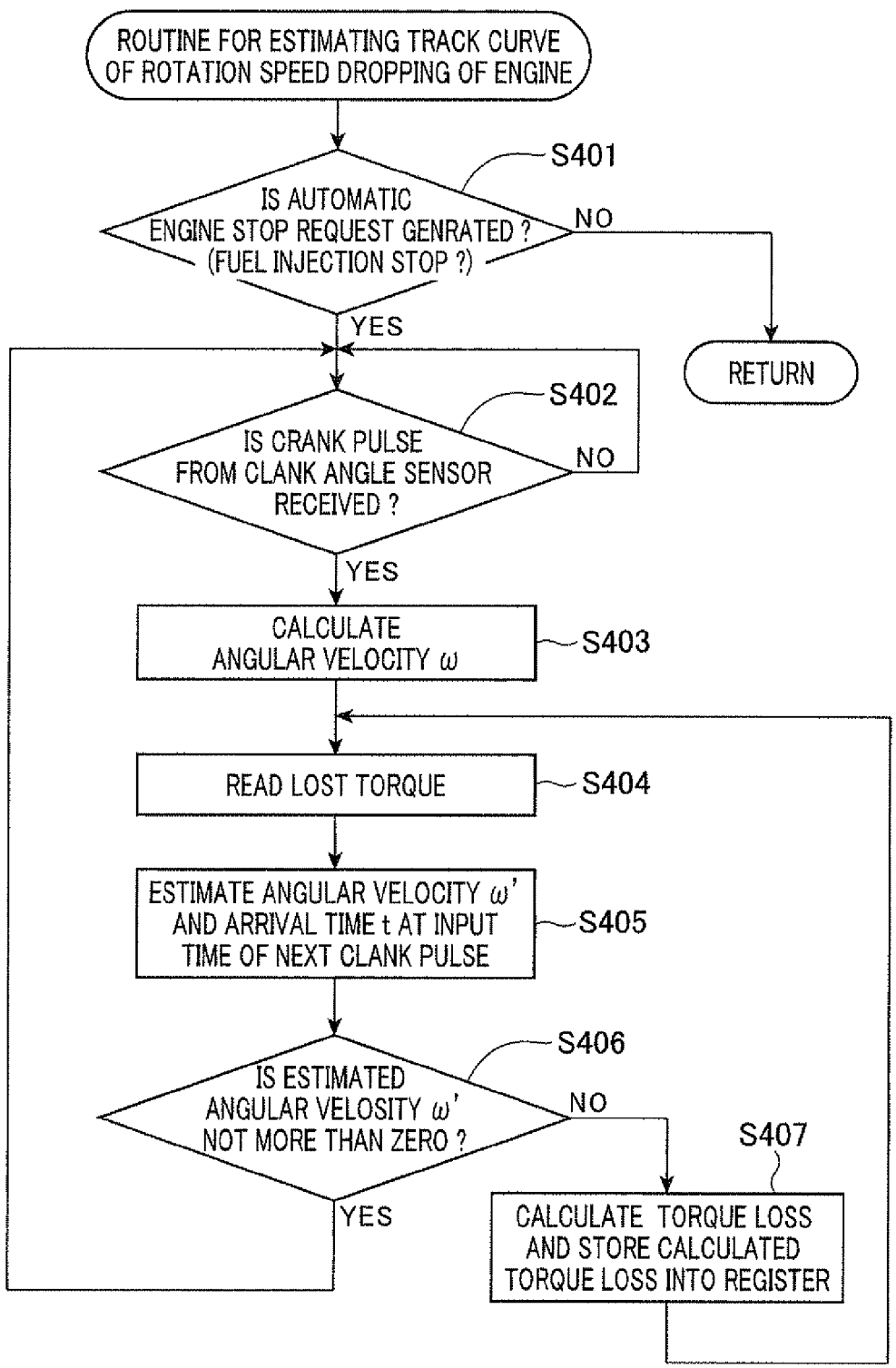
FIG. 16 is a flow chart showing a track curve estimation routine executed by the control device according to the fifth embodiment of the present invention.

FIG. 14 is a view showing an estimated track curve, when the rotation speed of the internal combustion engine is gradually decreased after the automatic engine stop, obtained by the control device according to the fifth embodiment of the present invention. FIG. 15 is a view showing a method of estimating the track curve when the rotation speed of the internal combustion engine is decreased after the automatic engine stop. FIG. 16 is a flow chart showing a track curve estimation routine executed by the ECU 20 in the control device according to the fifth embodiment.

In the system equipped with the control device which executes one of the first to fourth engine restart controls, the ECU 20 corresponds to a track curve estimation means capable of estimating the track curve of the rotation speed dropping of the internal combustion engine 21.

The ECU 20 further estimates the first rotation speed range, the second rotation speed range, the third rotation speed range, the fourth rotation speed range, and the rotation speed ready range on the basis of the estimated data regarding the track curve of the rotation speed dropping of the internal combustion engine 21. The ECU 20 further corresponds to the control means to determine the time when the pinion gear 13 is driven, and the time when the starter motor 12 is driven.

A description will now be given of the method of estimating the track curve of the rotation speed dropping of the internal combustion engine 21 performed by the control device according to the fifth embodiment.

In the method according to the fifth embodiment uses a crank angle sensor (omitted from drawings) which outputs a crank pulse every 30° CA.

While the rotation speed of the internal combustion engine is dropping due to the automatic engine stop, the ECU 20 receives the crank pulse transferred from the crank angle sensor every 30° CA, and calculates the angular velocity ω[rad/sec] by the following formula:

angular velocity $\omega = 30 \times 2\Pi/(360 \times tp)$, where tp designates an interval [sec] of crank pulse.

The ECU 20 calculates:

angular velocity $\omega[0, i-1]$ at crank angle of 0° CA after TDC (Top Dead Center) during previous 180° CA period $[i-1]$;

angular velocity $\omega[30, i-1]$ at crank angle of 30° CA;
angular velocity $\omega[60, i-1]$ at crank angle of 60° CA;
angular velocity $\omega[90, i-1]$ at crank angle of 90° CA;
angular velocity $\omega[120, i-1]$ at crank angle of 120° CA;
angular velocity $\omega[150, i-1]$ at crank angle of 150° CA; and
angular velocity $\omega[0, i]$ at crank angle of 0° CA after TDC during current 180° CA period $[i]$.

Further, the ECU 20 calculates:

torque loss T $[0-30, i-1]$ from crank angle of 0° CA to crank angle of 30° CA after TDC during previous 180° CA period $[i-1]$;

torque loss T $[30-60, i-1]$ from crank angle of 30° CA to crank angle of 60° CA;

torque loss T $[60-90, i-1]$ from crank angle of 60° CA to crank angle of 90° CA;

torque loss T $[90-120, i-1]$ from crank angle of 90° CA to crank angle of 120° CA;

torque loss T $[120-150, i-1]$ from crank angle of 120° CA to crank angle of 150° CA; and torque loss T $[150-0, i-1]$ from crank angle of 150° CA to crank angle of 180° CA after TDC during current 180° CA period $[i-1]$.

$T[0-30, i-1] = -J \cdot (\omega[30, i-1]^2 - \omega[30, i-1]^2)/2;$ $T[30-60, i-1] = -J \cdot (\omega[60, i-1]^2 - \omega[30, i-1]^2)/2;$ $T[60-90, i-1] = -J \cdot (\omega[90, i-1]^2 - \omega[60, i-1]^2)/2;$ $T[90-120, i-1] = -J \cdot (\omega[120, i-1]^2 - \omega[90, i-1]^2)/2;$ $T[120-150, i-1] = -J \cdot (\omega[150, i-1]^2 - \omega[120, i-1]^2)/2;$ and $T[150-0, i-1] = -J \cdot (\omega[0, i]^2 - \omega[150, i-1]^2)/2,$ where J indicates inertia.

The ECU 20 stores the above calculated torque loss T $[0-30, i-1]$ to T $[150-0, i-1]$ in a register shown in FIG. 15. The ECU 20 calculates the angular velocity $\omega[30, i]$ at crank angle of 30° CA after TDC during the current 180° CA period $[i]$, and further calculates the torque loss T $[0-30, i]$, and overwrites the calculated torque loss T $[0-30, i]$ into the register in order to store the calculated torque loss T$[0-30, i]$.

After this, as shown in FIG. 15, the ECU 20 periodically calculates following values:

an estimated angular velocity $\omega'[60, i]$ at crank angle of 60° CA after TDC during current 180° CA period $[i]$ and an estimated approaching period of time t$[30-60, i]$ from crank angle of 30° CA to crank angle of 60° CA on the basis of the torque loss t $[30-60, i-1]$ from crank angle of 30° CA to crank angle of 60° CA after TDC during previous 180° CA period $[i-1]$;

an estimated angular velocity $\omega'[90, i]$ at crank angle of 90° CA after TDC during current 180° CA period $[i]$ and an estimated approaching period of time t$[60-90, i]$ from crank angle of 60° CA to crank angle of 90° CA on the basis of the torque loss t $[60-90, i-1]$ from crank angle of 60° CA to crank angle of 90° CA during previous 180° CA period $[i-1]$ and the estimated angular velocity $\omega'[60, i]$; and an estimated angular velocity $\omega'[120, i]$ at crank angle of 120° CA after TDC during current 180° CA period $[i]$ and an estimated approaching period of time t$[90-120, i]$ from crank angle of 90° CA to crank angle of 120° CA on the basis of the torque loss T $[90-120, i-1]$ from crank angle of 90° CA to crank angle of 120° CA during previous 180° CA period $[i-1]$ and the estimated angular velocity $\omega'[90, i]$.

The ECU 20 periodically performs the above estimation calculation in order to estimate the track curve of the rotation speed dropping of the internal combustion engine 21.

The ECU 20 executes the above estimation calculation every arriving the crank pulse (every 30° CA) during the period of time until the next arrival of a new crank pulse. The ECU 20 updates the estimated data items regarding the track curve of the rotation speed dropping of the internal combustion engine 21 every the estimation calculation.

When there is a margin of the estimation calculation period of time until the next arrival of a new crank pulse, the ECU 20 estimates the track curve of the rotation speed dropping of the internal combustion engine 21 until the rotation of the internal combustion engine 21 is completely stopped. If there is no margin of the estimation calculation, the ECU 20 interrupts the estimation calculation, and performs the estimation calculation using the true angular velocity of the next crank angle. It is also possible to convert the angular velocity to the rotation speed of the internal combustion engine, and performs the estimation calculation using the reduced value of the rotation speed.

The ECU 20 executes the track curve estimation routine shown in FIG. 16 in order to estimate the track curve of the rotation speed dropping of the internal combustion engine 21. The track curve estimation routine estimates the track curve of the rotation speed dropping of the internal combustion engine 21.

The ECU 20 repeatedly executes the track curve estimation routine of estimating the track curve of the rotation speed drop shown in FIG. 16 at a predetermined period. The ECU 20 corresponds to an estimation means for estimating a track curve of a rotation speed dropping of the internal combustion engine. On executing the track curve estimation routine, the ECU 20 detects in step S401 whether or not the automatic engine stop request (or fuel injection stop request) occurs. When the detection result in step S401 indicates no generation of the automatic engine stop request ("No" in step S401), the ECU 20 completes this track curve estimation routine.

On the other hand, when the detection result in step S401 indicates that the automatic engine stop request occurs ("Yes" in step S401), the operation flow goes to step S402. In step S402, the ECU 20 detects whether or not receiving the crank pulse transferred from the crank angle sensor. The ECU 20 waits for the arrival of a crank pulse in step S402. When receiving the crank pulse transferred from the crank angle sensor, the operation flow goes to step S403. In step S403, the ECU 20 calculates the angular velocity ω at the arrival time of the crank pulse by the following formula.

$$\omega = 30 \times 2\Pi/(360 \times tp),\text{ where tp indicates an interval of arrival crank pulses.}$$

After this, the operation flow progresses to step S404. In step S404, the ECU 20 reads the data items of the torque loss of the internal combustion engine 21 stored in the register. The ECU 20 uses the torque loss stored in the register which was calculated when the crank pulse of 150° CA before. After this, the operation flow progresses to step S405. In step S405, the ECU 20 calculates an estimated angular velocity ω' when the next crank pulse will arrive. The ECU 20 further calculates an estimated arrival time t when receiving the next crank pulse.

The operation flow then goes to step S406. In step S406, the ECU 20 detects whether or not the track curve of the rotation speed dropping of the internal combustion engine 21 until the stop of the rotation of the internal combustion engine 21 has already been estimated on the basis of the condition whether or not the estimated angular velocity ω' at the time when the next crank pulse will arrive is not more than zero.

When the detection result in step S406 indicates that the estimated angular velocity ω' at the time when the next crank pulse will arrive is more than zero ("No" in step S406), the operation flow goes to step S407. In step S407, the ECU 20 calculates the torque loss of the internal combustion engine 21 and stores the calculated torque loss into the register. The ECU 20 repeatedly executes the step S404 and step S405 in order to calculate the estimated angular velocity ω' and the estimated arrival time t at the time when the ECU 20 receives the next crank pulse.

On the other hand, the detection result in step S406 indicates that the estimated angular velocity ω' when the next crank pulse will arrive is not more than zero ("Yes" in step S406), the operation flow returns to step S402.

The ECU 20 repeatedly executes the above steps of calculating the estimated angular velocity ω' and the estimated arrival time t every 30° CA. When the estimated angular velocity ω' is zero ("Yes" in step S406), the ECU 20 detects the completion of estimating the track curve of the rotation speed dropping of the internal combustion engine 21 until the stop of rotation of the internal combustion engine 21. The operation flow thereby returns to step S402. In step S402, the ECU 20 waits for a next arrival crank pulse.

The ECU 20 estimates the track curve of the rotation speed dropping of the internal combustion engine 21 until the stop of rotation of the internal combustion engine 21 every receiving the crank pulse by the above steps.

By the way, when the calculation period of time until a next arrival crank pulse is shorter than the period of time which is necessary to estimate the track curve of the rotation speed dropping of the internal combustion engine 21 until the stop of the rotation of the internal combustion engine 21, the ECU 20 interrupts the above estimation and calculation, and starts to calculate the next estimation of the track curve on the basis of a true angular velocity ω' with a new arrival crank angle.

According to the fifth embodiment, the ECU 20 estimates the track curve of the rotation speed dropping of the internal combustion engine 21 which is oscillated and gradually decreased until the completion of the stop of rotation of the internal combustion engine 21. It is possible for the control device having the ECU 20 to control the driving time of the pinion gear 13 (to push the pinion gear 13) and the driving time to start the starter motor 12 when the pinion gear 13 is meshed with the ring gear 23 even if the rotation speed of the internal combustion engine 21 is gradually decreased and oscillated while the rotation speed of the internal combustion engine is dropping due to the automatic engine stop.

The present invention is not limited by the estimation process disclosed in the fifth embodiment. It is possible to use other processes to estimate the track curve of the rotation speed dropping of the internal combustion engine 21 according to the type of applications.

It is further possible for the control device to be applied to various types of the engine restart systems.

(Other Aspects and Features of the Present Invention)

In the control device as the first or second aspect of the present invention, the second engine restart control means has a means for detecting the completion of the synchronization operation in which the pinion gear is synchronized in operation speed with the ring gear when a difference in rotation speed between the ring gear and the pinion gear is within a range of ±200 rpm. This makes it possible to detect the time when the rotation speed of the pinion gear is synchronized with the rotation speed of the ring gear, and prevent gear meshing noises from being generated when the pinion gear is meshed with the ring gear. The difference of the rotation speed between the ring gear and the pinion gear indicates a difference of the rotation speed which is a reduced value of the crank shaft speed.

In the control device as the first or second aspect of the present invention, the second engine restart control means has a means for detecting a completion of the synchronization operation in which the pinion gear is synchronized in operation speed with the ring gear when a difference in circumferential speed between a pitch circle of the ring gear and a pitch circle of the pinion gear is within a range of ±3.1 m/sec. This makes it possible to obtain the same effect supplied by the control device previously described.

In the control device as the first or second aspect of the present invention, the starter comprises a one-way clutch which transmits no rotation power from the pinion gear to the starter motor in a direction of the rotation of the internal combustion engine. The second engine restart control means has a means of detecting a completion of the synchronization operation in which the rotation speed of the pinion gear is synchronized with the rotation speed of the pinion gear when the rotation speed of the ring gear is higher than the rotation speed of the pinion gear and a difference in rotation speed between the pinion gear and the ring gear is not more than a predetermined rotation speed. When the pinion gear is meshed with the ring gear on the basis of the detection result by the second engine restart control means, it is possible to release a shock applied to the starter because the one-way clutch races even if the rotation speed of the ring gear is higher than the rotation speed of the pinion gear. After this, the one-way clutch is locked and the rotation power of the starter motor is then transmitted to the pinion gear when the difference of rotation speed between the ring gear and the pinion gear is zero accompanied with decreasing of the rotation speed of the internal combustion engine (as the rotation speed of the ring gear) and increasing of the rotation speed of the starter motor (as the rotation speed of the pinion gear). This makes it possible to smoothly mesh the pinion gear with the ring gear with a less shock to be applied to the components of the starter, and enhance the durability of the starter.

In the control device as the first or second aspect of the present invention, the means in the second engine restart control means detects the completion of the synchronization operation when the difference in rotation speed between the pinion gear and the ring gear is a value of not more than the predetermined rotation speed of 300 rpm. In particular, it is possible for the means in the second engine restart control means to detect the completion of the synchronization operation when the difference in rotation speed between the pinion gear and the ring gear is the predetermined rotation speed of 200 rpm. This makes it allow for the drive device to use a rotation speed sensor with low detection accuracy for detecting the rotation speed when the ring gear is synchronized with the pinion gear, and to avoid the use of an expensive crank angle sensor and an expensive rotation speed sensor. This also makes it possible to satisfy the manufacturing cost reduction as a recent technical trend which is an important matter.

In the control device as the first or second aspect of the present invention, the starter comprises a one-way clutch which transmits no rotation power from the pinion gear to the starter motor in a direction of the rotation of the internal combustion engine. The second engine restart control means has a means for detecting a completion of the synchronization operation in which the rotation speed of the pinion gear is synchronized with the rotation speed of the pinion gear when a circumferential speed of the ring gear is higher than a circumferential speed of the pinion gear and a difference in a circumferential speed between a pitch circle of the pinion gear and a pitch circle of the ring gear is within a range of 3.1 m/sec. This makes it possible for the control device to have the same effects previously described.

In the control device as the third aspect of the present invention, the first rotation speed is within a range of 300 rpm to 700 rpm. That is, when the rotation speed of the internal combustion engine while the rotation speed of the internal combustion engine is dropping due to the automatic engine stop is higher than the first rotation speed range of 300 rpm to 700 rpm, the control device can restart the internal combustion engine without performing any cranking by the starter. Therefore when a value in the first rotation speed range is set to the first rotation speed, the first rotation speed range is higher than the first rotation speed, in which the control device can restart the internal combustion engine without performing any cranking by the starter.

In the control device as the third aspect of the present invention, the third rotation speed is within a range of 50 rpm to 450 rpm. That is, it is possible to smoothly mesh the pinion gear with the ring gear without synchronizing the rotation speed of the pinion gear with the rotation speed of the ring gear when the rotation speed of the internal combustion engine is decreased and is not more than the third rotation speed (within the range of 50 rpm to 450 rpm). Accordingly, when a value in the range of 50 rpm to 450 rpm is set to the third rotation speed, the third rotation speed range which is lower than the third rotation speed range (of 50 rpm to 450 rpm) is the range in which the pinion gear is smoothly meshed with the ring gear without performing any synchronization of the rotation speed between the pinion gear and the ring gear.

In the control device as the third aspect of the present invention, the second rotation speed is a value which is higher than the third rotation speed by a range of 50 rpm to 150 rpm. This makes it possible to correctly set the rotation speed ready range which is not more than the second rotation speed and higher than the third rotation speed (or not more than the first rotation speed and higher than the second rotation speed).

In the control device as the fourth aspect of the present invention, the first rotation speed is within a range of 300 rpm to 700 rpm, or the third rotation speed is within a range of 50 rpm to 450 rpm.

By the way, there is a possibility for the internal combustion engine to alternately rotate forward and backward immediately when the rotation speed of the internal combustion engine is stopped because the rotation speed of the internal combustion engine is reversed immediately before the TDC (Top Dead centre). When the pinion gear is meshed with the ring gear during such an oscillation period of the rotation of the internal combustion engine forward and backward, the pinion gear crashes into or crushes the pinion gear when the internal combustion engine rotates backward. This applies a large stress to the pinion gear and often breaks the starter and generates large gear meshing noises.

In order to avoid such a problem, when the engine restart request occurs immediately when or before the internal combustion engine is completely stopped, the control device, namely the ECU, drives the actuator to mesh the pinion gear with the ring gear on the completion of the engine stop, and then drives the starter to perform the cranking after the rotation of the internal combustion engine is almost stopped after the oscillation period of rotation of the internal combustion engine. However, this control increases the delay period of time until the engine restart after the generation of the engine restart request.

The control device as another aspect of the present invention further has a fourth engine restart control means for driving the electromagnetic actuator to mesh the pinion gear with the ring gear when rotation speed of the internal combustion engine is decreased by the automatic engine stop and the current rotation speed of the internal combustion engine is further decreased to and reaches a predetermined rotation speed immediately before zero rpm. After this, the fourth engine restart control means for driving the starter motor to rotate the pinion gear in order to perform the cranking by the starter and restart the internal combustion engine.

This control makes it possible to escape the meshing operation between the pinion gear and the ring gear during the oscillation period of the rotation of the internal combustion engine because this control can mesh the pinion gear with the ring gear before the oscillation period of the rotation of the internal combustion engine immediately before the rotation of the internal combustion engine is stopped. This control can avoid the starter from being damaged and gear meshing noises from being generated, and can smoothly restart the internal combustion engine after the cranking by the starter.

In the above case, it is possible for the fourth engine restart control means in the control device to instruct the actuator to be electrically turned on in order to mesh the pinion gear with the ring gear when the rotation speed of the internal combustion engine is decreased by the automatic engine stop and the current rotation speed of the internal combustion engine is then decreased to and reaches a predetermined rotation speed immediately before zero rpm. The fourth engine control means drives the actuator to be electrically turned off when a predetermined period of time is elapsed counted from the time when the actuator is turned-on or when detecting the engagement between the pinion gear and the ring gear.

This control makes it possible for the control device to electrically turn off the actuator because it is possible to maintain the engagement between the pinion gear and the ring gear even if the control device stops the power supply to the actuator when the predetermined period of time is elapsed after the actuator is electrically turned on or when the sensor actually detects the engagement between the ring gear and the pinion gear. After this, it is possible to maintain the turned-off state of the actuator until the starter starts the cranking when the engine restart request occurs, and thereby to reduce the electric power consumption of the starter.

Further, it is possible to detect the rotation speed of the internal combustion engine on the basis of the output signal transferred from the crank angle sensor mounted to the internal combustion engine during the engine restart control. However, because a usual crank angle sensor available on the commercial market does not detect the rotation speed of the internal combustion engine with high accuracy (that is, does not detect the rotation speed which is lower than the rotation speed with high accuracy during the engine idling), it is necessary to use an expensive crank angle sensor capable of detecting the rotation speed of the internal combustion engine while the rotation speed of the internal combustion engine is dropping due to the automatic engine stop when the control device performs the engine restart control using the crank angle sensor.

In order to avoid such a problem, it is possible for the control device to further have a means for estimating the rotation speed of the internal combustion engine on the basis of the elapsed period of time counted from one of the time when the automatic engine stop request occurs and the time when the combustion of the internal combustion engine is stopped (fuel injection and ignition are stopped).

In general, it is possible to estimate the rotation speed of the internal combustion engine on the basis of the elapsed time period counted from the time when the engine restart request occurs or the time when the combustion of the internal combustion engine is stopped because the rotation speed of the internal combustion engine is gradually decreased according to the elapsed time period counted from the time when the engine restart request occurs or the time when the combustion of the internal combustion engine is stopped. This makes it possible to satisfy the recent trend to decrease the manufacturing cost without using an expensive crank angle sensor capable of detecting the rotation speed with high accuracy while the rotation speed of the internal combustion engine is dropping.

Still further, it is possible for detect the rotation speed of the internal combustion engine on the basis of the output signal transferred from the sensor for detecting the rotation speed of the starter motor (or of the pinion gear) during the engine restart control. It is also possible for the control device to have a means for estimating the rotation speed of the pinion gear on the basis of at least one of a period of time to supply an electric power to the starter motor and a current to the starter motor.

In general, the rotation speed of motor is increased according to the elapsed time period after the electric power is supplied to the starter motor and the rotation speed of the pinion gear is thereby increased. The more the current (or the duty ratio) to be supplied to the starter motor is increased, the more the rotation speed of the starter motor (or the pinion gear) is increased. It is thereby possible to estimate the rotation speed of the pinion gear on the basis of the current supplying period to the starter motor or the rotation speed of the starter motor (or the pinion gear). This makes it possible to satisfy the recent trend to decrease the manufacturing cost.

The control device as another aspect of the present invention further has an estimation means and a control means. The estimation means estimates a track curve of a rotation speed dropping of the internal combustion engine caused by the automatic engine stop. The control means detects the rotation speed ready range on the basis of the estimated data (estimated data items of the rotation speed of the internal combustion engine) regarding the track curve of the rotation speed dropping of the internal combustion engine. The control device determines a drive time when the pinion gear is driven and a drive time when the starter motor is driven. This control makes it possible to estimate the track curve of the rotation speed dropping of the internal combustion engine in which the rotation speed is oscillated and gradually decreased during the automatic engine stop. Accordingly, it is possible to control the driving time of the pinion gear (or the pushing time to push the pinion gear into the ring gear) when the pinion gear is meshed with the ring gear, and the driving time to drive the starter motor with high accuracy.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A control device for controlling automatic engine stop and start comprising:
   a starter comprised of a starter motor for rotating a pinion gear and an actuator capable of meshing the pinion gear with a ring gear which is fixed to a crank shaft of an internal combustion engine, and the starter independently driving the starter motor and the actuator, respectively, and the control device being capable of stopping the internal combustion engine when an automatic engine stop request occurs, and restarting the internal combustion engine when an engine restart request occurs;
   a first engine restart control means which executes a first engine restart control of restarting a fuel injection in order to restart the internal combustion engine without performing a cranking by the starter when the engine restart request occurs while the rotation speed of the internal combustion engine is dropping due to the automatic engine stop request and when a current rotation speed of the internal combustion engine is within a first rotation speed range which is higher than a first rotation speed;

a second engine restart control means which executes a second engine restart control of driving the starter motor in order to synchronize the rotation speed of the pinion gear with the rotation speed of the ring gear, and driving the actuator to mesh the pinion gear with the ring gear in order to perform the cranking and restart the internal combustion engine while the rotation speed of the internal combustion engine is dropping due to the automatic engine stop request and when the engine restart request occurs when the current rotation speed of the internal combustion engine is within a second rotation speed range which is not more than the first rotation speed and higher than a second rotation speed;

an engine restart ready control means which executes an engine restart ready control of not driving the starter to perform the cranking when the engine restart request occurs while the rotation speed of the internal combustion engine is dropping due to the automatic engine stop request and when the current rotation speed of the internal combustion engine is within a rotation speed ready range which is not more than the second rotation speed and higher than a third rotation speed, and after this control operation, the engine restart ready control means driving the actuator to mesh the pinion gear with the ring gear when the current rotation speed of the internal combustion engine is within a third rotation speed range which is not more than the third rotation speed, and after or during this gear meshing operation, the engine restart ready control means driving the starter to perform the cranking by the starter motor; and a third engine restart control means which executes a third engine restart control of driving the actuator to mesh the pinion gear with the ring gear when the engine restart request occurs while the rotation speed of the internal combustion engine is dropping due to the automatic engine stop request and when the current rotation speed of the internal combustion engine is within the third rotation speed range which is not more than the third rotation speed, and after or during this gear meshing operation, the third engine restart control means driving the starter to perform the cranking in order to restart the internal combustion engine.

2. A control device for controlling automatic engine stop and start comprising:

a starter comprised of a starter motor for rotating a pinion gear and an actuator capable of meshing the pinion gear with a ring gear which is fixed to a crank shaft of an internal combustion engine, and the starter independently driving the starter motor and the actuator, respectively, and the control device being capable of stopping the internal combustion engine when an automatic engine stop request occurs, and restarting the internal combustion engine when an engine restart request occurs;

a second engine restart control means which executes a second engine restart control for driving the starter motor in order to synchronize the rotation speed of the pinion gear with the rotation speed of the ring gear, and driving the actuator to mesh the pinion gear with the ring gear in order to perform the cranking and restart the internal combustion engine when the rotation speed of the internal combustion engine is dropping due to the automatic engine stop request and when the engine restart request occurs when a current rotation speed of the internal combustion engine is within a second rotation speed range which is not more than a first rotation speed and higher than a second rotation speed;

an engine restart ready control means which executes an engine restart ready control of not driving the starter to perform the cranking when the engine restart request occurs while the rotation speed of the internal combustion engine is dropping due to the automatic engine stop request and when the current rotation speed of the internal combustion engine is within a rotation speed ready range which is not more than the second rotation speed and higher than a third rotation speed, and after this control operation, the engine restart ready control means driving the actuator to mesh the pinion gear with the ring gear when the current rotation speed of the internal combustion engine is within a third rotation speed range which is not more than the third rotation speed, and after or during this gear meshing operation, the engine restart ready control means driving the starter to perform the cranking by the starter motor; and a third engine restart control means which executes a third engine restart control of driving the actuator to mesh the pinion gear with the ring gear when the engine restart request occurs while the rotation speed of the internal combustion engine is dropping due to the automatic engine stop request and when the current rotation speed of the internal combustion engine is within the third rotation speed range which is not more than the third rotation speed, and after or during this gear meshing operation, the engine restart ready control means driving the starter to perform the cranking by the starter motor in order to restart the internal combustion engine.

3. The control device according to claim 1, wherein the second engine restart control means comprises a means for detecting a completion of the synchronization operation in which the rotation speed of the pinion gear is synchronized with the rotation speed of the ring gear when a difference in rotation speed between the ring gear and the pinion gear is within a range of ±200 rpm.

4. The control device according to claim 1, wherein the second engine restart control means comprises a means for detecting a completion of the synchronization operation in which the rotation speed of the pinion gear is synchronized with the rotation speed of the ring gear when a difference in circumferential speed between a pitch circle of the ring gear and a pitch circle of the pinion gear is within a range of ±3.1 m/sec.

5. The control device according to claim 1, wherein the starter comprises a one-way clutch which transmits no rotation power from the pinion gear to the starter motor in a direction of the rotation of the internal combustion engine, and the second engine restart control means has a means for detecting a completion of the synchronization operation in which the rotation speed of the pinion gear is synchronized with the rotation speed of the pinion gear when the rotation speed of the ring gear is higher than the rotation speed of the pinion gear and a difference in rotation speed between the pinion gear and the ring gear is not more than a predetermined rotation speed.

6. The control device according to claim 5, wherein the predetermined rotation speed is not more than the predetermined rotation speed of 300 rpm.

7. The control device according to claim 6, wherein the predetermined rotation speed is not more than the predetermined rotation speed of 200 rpm.

8. The control device according to claim 1, wherein the starter comprises a one-way clutch which transmits no rotation power from the pinion gear to the starter motor in the rotation direction of the internal combustion engine, and the second engine restart control means has a means for detecting a completion of the synchronization operation in which the rotation speed of the pinion gear is synchronized with the rotation speed of the pinion gear when a circumferential speed of the ring gear is higher than a circumferential speed of the pinion gear and a difference in a circumferential speed between a pitch circle of the pinion gear and a pitch circle of the ring gear is within a range of 3.1 m/sec.

9. A control device for controlling automatic engine stop and start comprising:
a starter comprised of a starter motor for rotating a pinion gear and an actuator capable of meshing the pinion gear with a ring gear which is fixed to a crank shaft of an internal combustion engine, and the starter independently driving the starter motor and the actuator, respectively, and the control device being capable of stopping the internal combustion engine when an automatic engine stop request occurs, and restarting the internal combustion engine when an engine restart request occurs;
a first engine restart control means which executes a first engine restart control of restarting a fuel injection in order to restart the internal combustion engine without performing a cranking by the starter when the engine restart request occurs while the rotation speed of the internal combustion engine is dropping due to the automatic engine stop request and when a current rotation speed of the internal combustion engine is within a first rotation speed range which is higher than a first rotation speed; and
an engine restart ready control means which executes an engine restart ready control of not driving the starter to perform the cranking when the engine restart request occurs while the rotation speed of the internal combustion engine is dropping due to the automatic engine stop request and when the current rotation speed of the internal combustion engine is within a rotation speed ready range which is not more than the first rotation speed and higher than a second rotation speed, and after this control operation, the engine restart ready control means driving the starter motor to synchronize the rotation speed of the pinion gear with the rotation speed of the ring gear when the current rotation speed of the internal combustion engine is within a second rotation speed range which is not more than the second rotation speed and higher than a third rotation speed, and after this synchronizing operation, the engine restart ready control means driving the actuator to mesh the pinion gear with the ring gear, and then driving the starter to perform the cranking by the starter motor in order to restart the internal combustion engine.

10. The control device according to claim 1, wherein the first rotation speed is within a range of 300 rpm to 700 rpm.

11. The control device according to claim 1, wherein the third rotation speed is within a range of 50 rpm to 450 rpm.

12. The control device according to claim 9, wherein the second rotation speed is higher than the third rotation speed by a range of 50 rpm to 150 rpm.

13. A control device for controlling automatic engine stop and start comprising:
a starter comprised of a starter motor for rotating a pinion gear and an actuator capable of meshing the pinion gear with a ring gear which is fixed to a crank shaft of an internal combustion engine, and the starter independently driving the starter motor and the actuator, respectively, and the control device being capable of stopping the internal combustion engine when an automatic engine stop request occurs, and restarting the internal combustion engine when an engine restart request occurs;
a first engine restart control means which executes a first engine restart control of restarting a fuel injection in order to restart the internal combustion engine without performing a cranking by the starter when the engine restart request occurs while the rotation speed of the internal combustion engine is dropping due to the automatic engine stop request and when a current rotation speed of the internal combustion engine is within a first rotation speed range which is higher than a first rotation speed; and
an engine restart ready control means which executes an engine restart ready control of not driving the starter to perform the cranking when the engine restart request occurs while the rotation speed of the internal combustion engine is dropping due to the automatic engine stop request and the current rotation speed of the internal combustion engine is within a rotation speed ready range which is not more than the first rotation speed and higher than a third rotation speed, and after this control operation, the engine restart ready control means driving the actuator to mesh the pinion gear with the ring gear when the current rotation speed of the internal combustion engine is within a third rotation speed range which is not more than the third rotation speed, and after or during this gear meshing operation, the engine restart ready control means driving the starter to perform the cranking by the starter motor, in order to restart the internal combustion engine.

14. The control device according to claim 13, wherein the first rotation speed is within a range of 300 rpm to 700 rpm.

15. The control device according to claim 13, wherein the third rotation speed is within a range of 50 rpm to 450 rpm.

16. The control device according to claim 1, further comprising a fourth engine restart control means which drives an electromagnetic actuator to mesh the pinion gear with the ring gear while the rotation speed of the internal combustion engine is dropping due to the automatic engine stop request and when the current rotation speed of the internal combustion engine is further decreased to and reaches a predetermined rotation speed immediately before zero rpm, and the fourth engine restart control means for driving the starter motor to rotate the pinion gear in order to perform the cranking by the starter and restart the internal combustion engine.

17. The control device according to claim 16, wherein the fourth engine restart control means drives the actuator to be electrically turned on in order to mesh the pinion gear with the ring gear while the rotation speed of the internal combustion engine is dropping due to the automatic engine stop request and when the current rotation speed of the internal combustion engine is decreased to and reaches a predetermined rotation speed immediately before zero rpm, and the fourth engine control means drives the actuator to be electrically turned off when a predetermined period of time is elapsed counted from the time when the actuator is turned on or the time when the meshed state between the pinion gear and the ring gear is detected.

18. The control device according to claim 1, further comprising a means for estimating the rotation speed of the internal combustion engine on the basis of an elapsed period of time counted from one of the time when the automatic engine stop request occurs and the time when the combustion of the internal combustion engine is stopped.

19. The control device according to claim 1, further comprising a means for estimating the rotation speed of the pinion gear on the basis of at least one of a period of time to supply an electric power to the starter motor and a current to the starter motor.

20. The control device according to claim 1, further comprising an estimation means for estimating a track curve of a rotation speed dropping of the internal combustion engine caused by the automatic engine stop request; and a control means for detecting the rotation speed ready range on the basis of the estimated data regarding the track curve of the rotation speed dropping of the internal combustion engine, and determining a drive time when the pinion gear is driven and a drive time when the starter motor is driven.

* * * * *